(12) United States Patent
Ishida et al.

(10) Patent No.: US 12,184,332 B2
(45) Date of Patent: Dec. 31, 2024

(54) SINGLE-FIBER BIDIRECTIONAL OPTICAL RING SYSTEM, METHOD FOR CONTROLLING SINGLE-FIBER BIDIRECTIONAL OPTICAL RING SYSTEM, AND CENTRAL STATION

(71) Applicant: Mitsubishi Electric Corporation, Tokyo (JP)

(72) Inventors: Kazuyuki Ishida, Tokyo (JP); Ayano Sakamoto, Tokyo (JP); Satoshi Yoshima, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 163 days.

(21) Appl. No.: 18/162,996

(22) Filed: Feb. 1, 2023

(65) Prior Publication Data
US 2023/0179304 A1 Jun. 8, 2023

Related U.S. Application Data

(63) Continuation of application No. PCT/JP2020/035510, filed on Sep. 18, 2020.

(51) Int. Cl.
*H04B 10/275* (2013.01)
*H04B 10/25* (2013.01)
(Continued)

(52) U.S. Cl.
CPC ....... *H04B 10/275* (2013.01); *H04B 10/2589* (2020.05); *H04B 10/40* (2013.01); *H04J 14/04* (2013.01)

(58) Field of Classification Search
CPC .......................... H04B 10/275; H04J 14/0283
See application file for complete search history.

(56) References Cited

U.S. PATENT DOCUMENTS 6,327,400 B1 * 12/2001 Harstead .............. H04B 10/275
385/16
2003/0198472 A1 * 10/2003 Talbot ................. H04J 14/0283
398/79
(Continued)

FOREIGN PATENT DOCUMENTS

JP 4852260 B2 1/2012
JP 5287956 B2 9/2013

OTHER PUBLICATIONS

Yeh et al., "Self-Healing Ring-Architecture Power-Splitting Passive Optical Networks against Fiber Fault", IEEE Xplore, Nov. 2007, total 2 pages.

*Primary Examiner* — Nathan M Cors
(74) *Attorney, Agent, or Firm* — Birch, Stewart, Kolasch & Birch, LLP

(57) ABSTRACT

A single-fiber bidirectional optical ring system includes: a central station; slave stations; and a network which connects the central station and the slave stations in a ring shape by optical fibers. The central station includes: a first single-fiber bidirectional optical transceiver connected in a clockwise direction of the network, which outputs a downstream optical signal of a second wavelength and receives an upstream optical signal of a first wavelength; a second single-fiber bidirectional optical transceiver connected in a counterclockwise direction of the network, which outputs a downstream optical signal of the second wavelength and receives an upstream optical signal of the first wavelength; and a first time synchronization control circuit that adjusts timings at which the downstream optical signals of the second wavelength are outputted, and causes the first and second single-fiber bidirectional optical transceivers to output the downstream optical signals of the second wavelength in different time slots.

8 Claims, 11 Drawing Sheets

(51) Int. Cl.
   *H04B 10/40* (2013.01)
   *H04J 14/02* (2006.01)
   *H04J 14/04* (2006.01)

(56) References Cited

U.S. PATENT DOCUMENTS

2005/0019031 A1* 1/2005 Ye .................. H04B 10/077
                                                    398/19
2005/0031345 A1* 2/2005 Sharma ............ H04J 14/0283
                                                    398/45

* cited by examiner

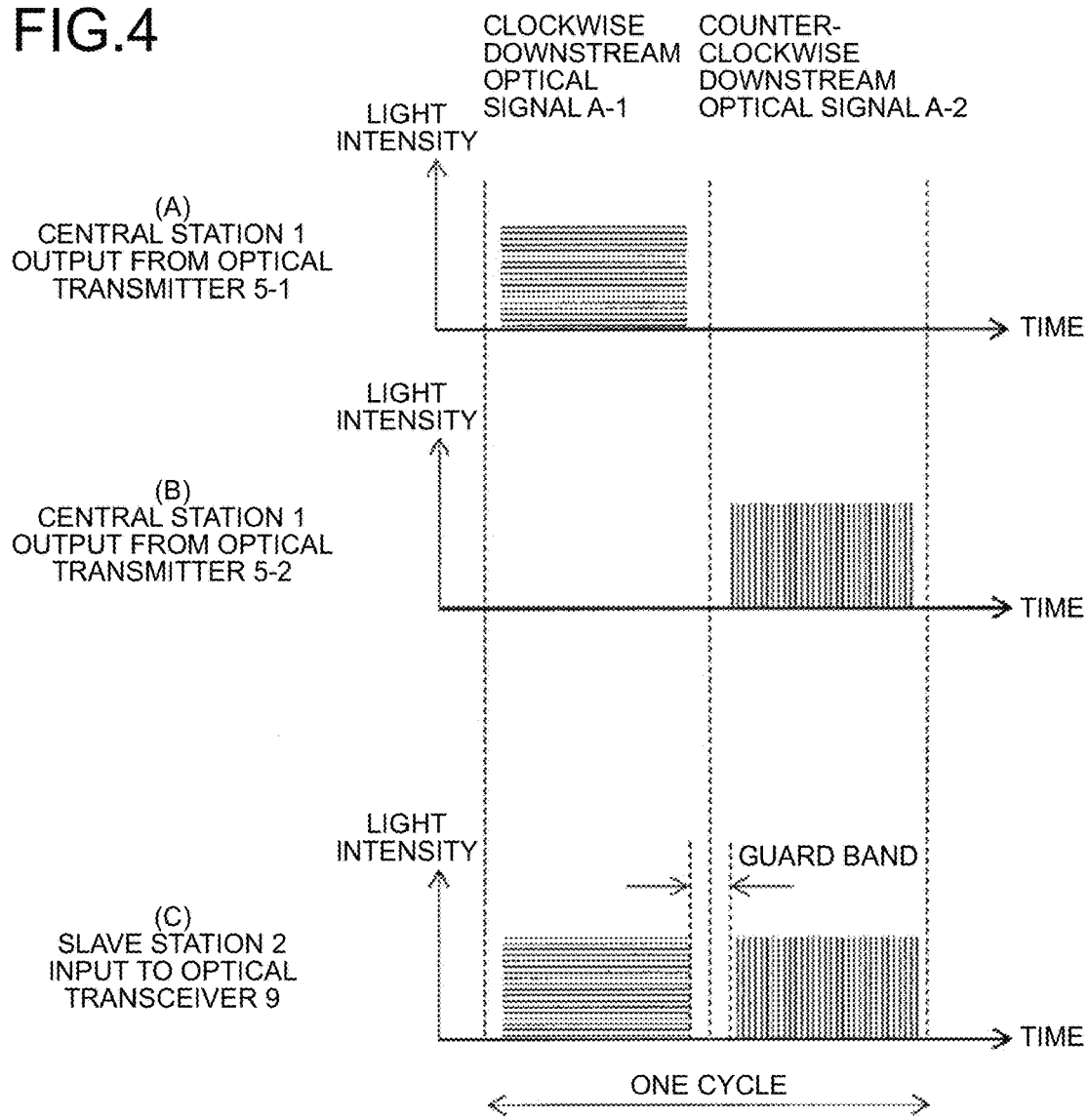
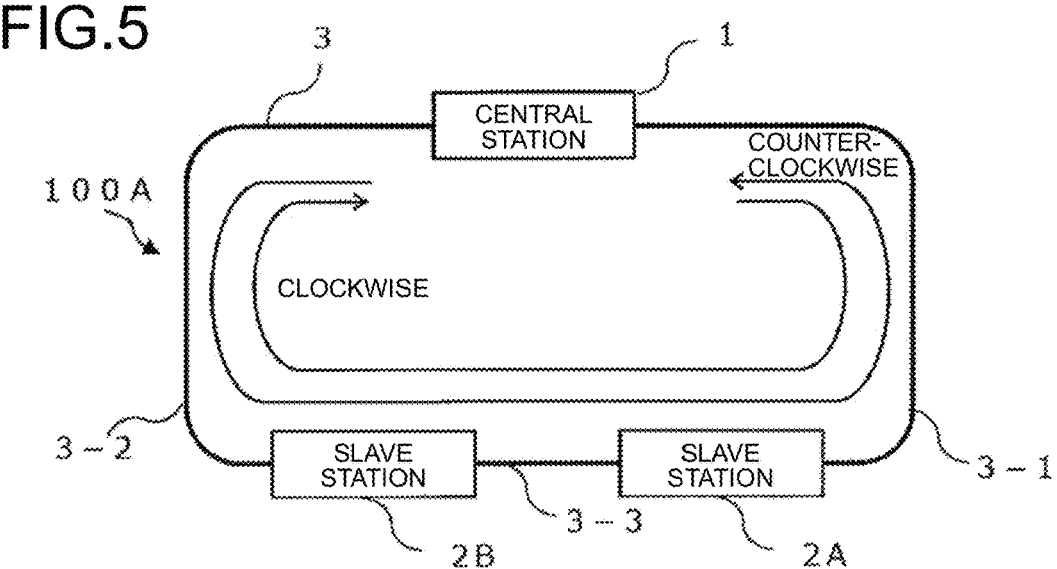

SINGLE-FIBER BIDIRECTIONAL OPTICAL RING SYSTEM, METHOD FOR CONTROLLING SINGLE-FIBER BIDIRECTIONAL OPTICAL RING SYSTEM, AND CENTRAL STATION

CROSS-REFERENCE TO RELATED APPLICATION

This application is a continuation application of International Application PCT/JP2020/035510, filed on Sep. 18, 2020, and designating the U.S., the entire contents of which are incorporated herein by reference.

BACKGROUND OF THE INVENTION

1. Field of the Invention

The present invention relates to a single-fiber bidirectional optical ring system, a method for controlling a single-fiber bidirectional optical ring system, and a central station.

2. Description of the Related Art

In the future, vehicles such as passenger cars are expected to be equipped with a large number of cameras, radar devices, and the like for advanced driver-assistance systems and automatic driving systems, in addition to conventional information devices such as car navigation systems and audio devices. Furthermore, it is expected that the amount of data to be generated between each device and its control device and between control devices dramatically increases, and that the number of transmission lines connecting the devices also increases. Under such circumstances, it is important not only to increase the capacity of a network in a vehicle, but also to simplify the network. For example, a study has been made of the form of a network in which a large number of control devices are aggregated into a plurality of domain-type control devices and the plurality of domain-type control devices and a central controller are connected to each other. In addition, a study has also been made of applying an optical fiber to a transmission path of a network so as to increase network capacity and reduce the load on the network.

One of the problems is to ensure high reliability together with cost reduction in applying a network using an optical fiber in a vehicle. Therefore, a technique of making an optical fiber transmission path redundant as a ring-type topology has been proposed. For example, Non Patent Literature 1, "Chien-Hung Yeh and Sien Chi, "Self-Healing Ring-Based Time-Sharing Passive Optical Networks," IEEE Photon. Technol. Lett., vol. 19, no. 15, pp. 1139-1141." proposes application of a passive optical network (PON) system, which is an optical communication technique for fiber to the home (FTTH), to a ring-type topology.

Since the PON system allows bidirectional communication to be performed by use of a single optical fiber, reduction in the number of optical fibers as transmission lines and cost reduction can be expected. According to FIGS. 2 and 3 of the above-described literature, a central station (optical line terminal (OLT)) and a slave station (optical network unit (ONU)) connected under the control of the central station perform bidirectional communication by using a path that is a working path of an optical fiber ring in a normal state, and when a transmission path failure occurs, the central station and the slave station continue communication by switching the path to a backup path in a direction opposite to the direction of the optical fiber ring. Redundancy of the transmission path is thus achieved.

In addition, Japanese Patent No. 5287956 proposes providing redundancy in a signal transmission direction so that a direction of the flow of signals to be transmitted and received by an optical line terminal (OLT) and each optical network unit (ONU) can be set to either a counterclockwise direction or a clockwise direction.

The technique described in the above Non Patent Literature 1 has a problem in that since a communication path is switched to a backup communication path to resume communication after disconnection of the communication path is detected, it takes time to resume communication after the disconnection of communication occurs.

In addition, the technique described in Japanese Patent No. 5287956 has a problem in that a configuration becomes complicated because it is necessary to assign different encoding method and optical wavelength for each of optical network units (slave stations).

SUMMARY OF THE INVENTION

The present disclosure includes: a central station; one or more slave stations to perform single-fiber bidirectional communication with the central station; and a network in which the central station and the one or more slave stations are connected in a ring shape by optical fibers. The central station includes: a first single-fiber bidirectional optical transceiver connected in a clockwise direction of the network, the first single-fiber bidirectional optical transceiver outputting a downstream optical signal of a second wavelength and receiving an upstream optical signal of a first wavelength output from the one or more slave stations; a second single-fiber bidirectional optical transceiver connected in a counterclockwise direction of the network, the second single-fiber bidirectional optical transceiver outputting a downstream optical signal of the second wavelength and receiving an upstream optical signal of the first wavelength output from the one or more slave stations; and a first time synchronization control circuit to adjust timings at which the first single-fiber bidirectional optical transceiver and the second single-fiber bidirectional optical transceiver output the downstream optical signals of the second wavelength, and cause the first single-fiber bidirectional optical transceiver and the second single-fiber bidirectional optical transceiver to output the downstream optical signals of the second wavelength in different time slots into which a predetermined cycle is divided.

BRIEF DESCRIPTION OF THE DRAWINGS

FIG. 4 is a diagram showing examples of downstream optical signals to be output from the central station and input to the slave station;

FIG. 5 is a schematic diagram illustrating a configuration of a single-fiber bidirectional optical ring system;

DETAILED DESCRIPTION OF THE PREFERRED EMBODIMENTS

Figure 1:
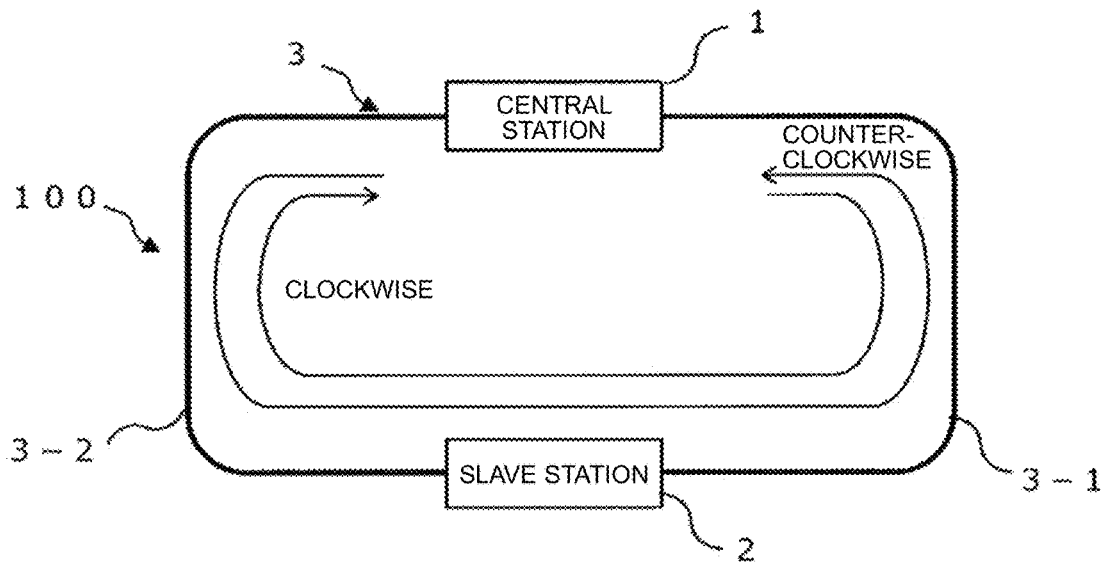
FIG. 1 is a schematic diagram illustrating a configuration of a single-fiber bidirectional optical ring system.

In the all drawings, the same constituent elements are denoted by the same reference numerals, and redundant description thereof will be omitted.

First Embodiment

FIG. 1 is a schematic diagram illustrating a configuration of a single-fiber bidirectional optical ring system 100 in a first embodiment.

The single-fiber bidirectional optical ring system 100 includes a central station 1, a slave station 2, an optical fiber 3-1, and an optical fiber 3-2. The central station 1 and the slave station 2 are connected in a ring shape via the optical fiber 3-1 and the optical fiber 3-2. The central station 1 and the slave station 2 perform single-fiber bidirectional communication. The optical fiber 3-1 is a part of a network 3 that connects the central station 1 and the slave station 2. The optical fiber 3-2 is a part of the network 3 that connects the central station 1 and the slave station 2. That is, the central station 1 and the slave station 2 are connected by the network 3 using redundant optical fibers. Note that each of the optical fiber 3-1 and the optical fiber 3-2 may be provided as part of a multi-core optical fiber. In addition, in a case where it is not necessary to describe the optical fiber 3-1 and the optical fiber 3-2 distinguished from each other, the optical fiber 3-1 and the optical fiber 3-2 will be simply referred to as the network 3. In the following description, a direction of transmission in the network 3 from the central station 1 to the slave station 2 via the optical fiber 3-1 and a direction of transmission in the network 3 from the slave station 2 to the central station 1 via the optical fiber 3-2 are each referred to as a "clockwise" direction. In addition, a direction of transmission in the network 3 from the central station 1 to the slave station 2 via the optical fiber 3-2 and a direction of transmission in the network 3 from the slave station 2 to the central station 1 via the optical fiber 3-1 are each referred to as a "counterclockwise" direction.

Figure 2:
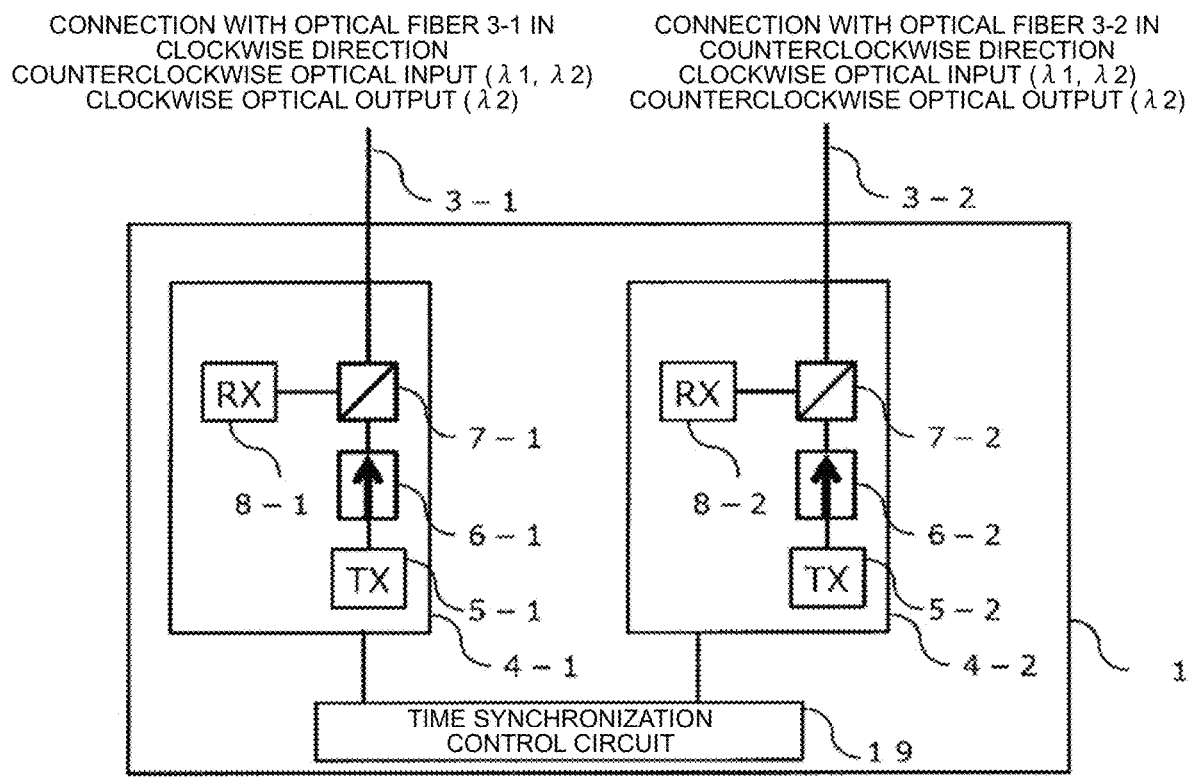
FIG. 2 is a schematic configuration diagram illustrating connection between a central station and optical fibers.

FIG. 2 is a schematic configuration diagram illustrating connection between the central station 1 and the network 3.

The central station 1 includes an optical transceiver 4-1, an optical transceiver 4-2, and a time synchronization control circuit 19. The optical transceiver 4-1 is connected to the slave station 2 via the optical fiber 3-1. That is, the optical transceiver 4-1 is an example of a first single-fiber bidirectional optical transceiver connected in the clockwise direction of the network 3. In addition, the optical transceiver 4-2 is connected to the slave station 2 via the optical fiber 3-2. That is, the optical transceiver 4-2 is an example of a second single-fiber bidirectional optical transceiver connected in the counterclockwise direction of the network 3. In the following description, the optical transceiver 4-1 and the optical transceiver 4-2 will be simply referred to as optical transceivers 4 in a case where it is not necessary to describe the optical transceiver 4-1 and the optical transceiver 4-2 distinguished from each other. The optical transceiver 4 includes an optical transmitter 5, an optical isolator 6, an optical wavelength demultiplexing filter 7, and an optical receiver 8. The optical transmitter 5 generates a downstream optical signal of a second wavelength. The optical isolator 6 makes the downstream optical signal of the second wavelength which is generated by the optical transmitter 5 and traveling toward the optical wavelength demultiplexing filter 7 pass through, and blocks an optical signal traveling in a direction opposite to a direction in which the downstream optical signal travels. The optical wavelength demultiplexing filter 7 outputs, to the network 3, the downstream optical signal of the second wavelength transmitted through the optical isolator 6. Furthermore, the optical wavelength demultiplexing filter 7 demultiplexes and extracts an upstream optical signal of a first wavelength output from the slave station 2. The optical receiver 8 receives the upstream optical signal of the first wavelength demultiplexed and extracted by the optical wavelength demultiplexing filter 7.

The time synchronization control circuit 19 is an example of a first time synchronization control circuit, and is connected to each of the optical transceiver 4-1 and the optical transceiver 4-2. The time synchronization control circuit 19 adjusts timings at which the optical transceiver 4-1 and the optical transceiver 4-2 output downstream optical signals of the second wavelength. Specifically, the time synchronization control circuit 19 causes an optical transmitter 5-1 and an optical transmitter 5-2 to output downstream optical signals of the second wavelength in different time slots into which a predetermined cycle is divided.

Figure 3:
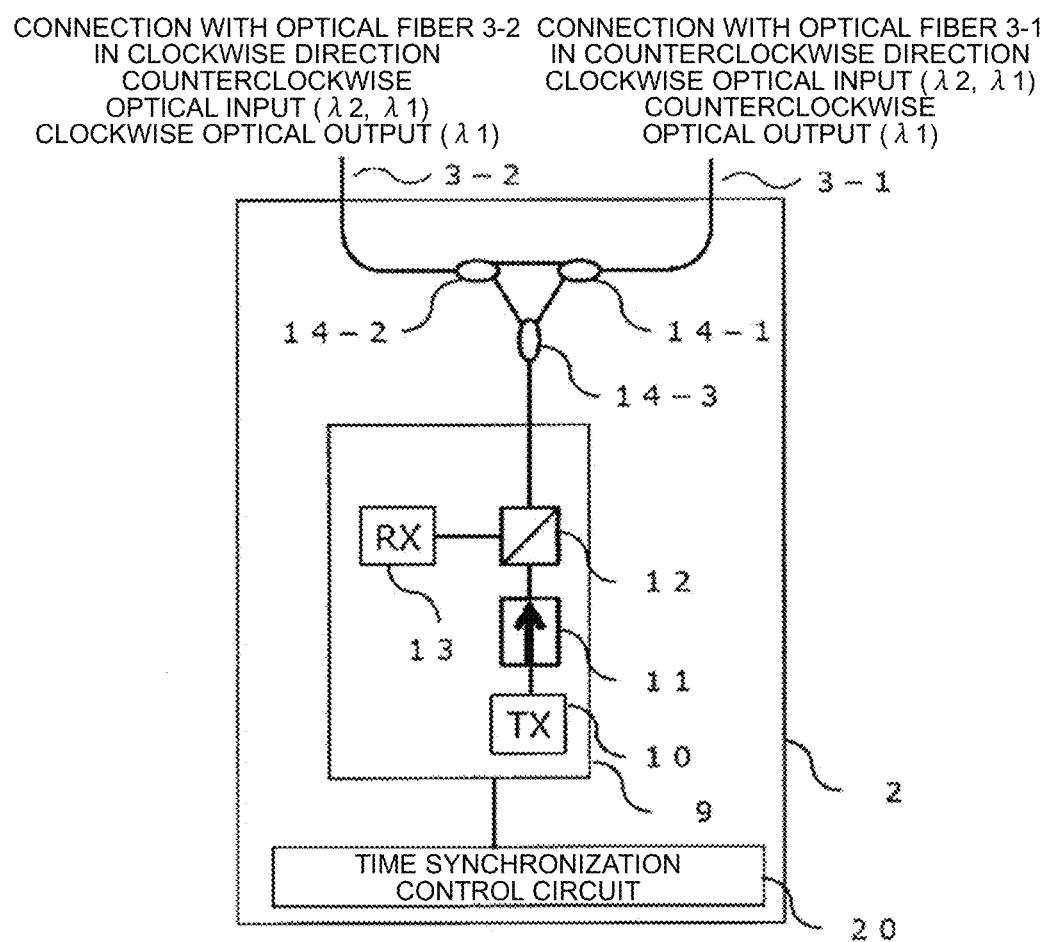
FIG. 3 is a schematic configuration diagram illustrating connection between a slave station and the optical fibers.

FIG. 3 is a schematic configuration diagram illustrating connection between the slave station 2 and the optical fibers 3.

The slave station 2 includes an optical transceiver 9, an optical coupler 14-1, an optical coupler 14-2, an optical coupler 14-3, and a time synchronization control circuit 20. The time synchronization control circuit 20 is an example of a second time synchronization control circuit. The time synchronization control circuit 20 is connected to the optical transceiver 9, and adjusts a timing at which the optical transceiver 9 outputs an upstream optical signal. The optical transceiver 9 is an example of a third single-fiber bidirectional optical transceiver, and includes an optical transmitter 10, an optical isolator 11, an optical wavelength demultiplexing filter 12, and an optical receiver 13. The optical transmitter 10 generates an upstream optical signal of the first wavelength. The optical isolator 11 makes the upstream optical signal of the first wavelength which is generated by the optical transmitter 10 and traveling toward the optical wavelength demultiplexing filter 12 pass through, and blocks an optical signal traveling in a direction opposite to a direction in which the upstream optical signal travels. The optical wavelength demultiplexing filter 12 outputs, to the network 3, the upstream optical signal of the first wavelength transmitted through the optical isolator 11. Furthermore, the optical wavelength demultiplexing filter 12 demultiplexes and extracts the downstream optical signals of the second wavelength output from the central station 1. The optical receiver 13 receives the downstream optical signals of the second wavelength demultiplexed and extracted by the optical wavelength demultiplexing filter 12. The optical transceiver 9 is connected to the optical coupler 14-3 (an example of a third optical coupler). The optical coupler 14-1, the optical coupler 14-2, and the optical coupler 14-3 are annularly connected. Specifically, the optical coupler 14-1 and the optical coupler 14-2 are connected to each other, the optical coupler 14-2 and the optical coupler 14-3 are connected to each other, and the optical coupler 14-3 and the optical coupler 14-1 are connected to each other. The optical coupler 14-1 is an example of a first optical coupler, and is connected to the optical fiber 3-1. Furthermore, the optical coupler 14-2 is an example of a second optical coupler, and is connected to the optical fiber 3-2. With this configuration, a downstream optical signal input to the optical coupler 14-1 is branched and input to each of the optical coupler 14-2 and the optical coupler 14-3. A downstream optical signal input to the optical coupler 14-2 is branched and input to each of the optical coupler 14-3 and the optical coupler 14-1. An upstream optical signal input to the optical coupler 14-3 is branched and input to each of the optical coupler 14-1 and the optical coupler 14-2.

Next, operation will be described.

First, a description will be given of a mode in which downstream optical signals of the second wavelength ($\lambda$2) are output from the central station 1 toward the slave station 2 (downstream direction).

The time synchronization control circuit 19 of the central station 1 adjusts the timings at which the optical transceiver 4-1 and the optical transceiver 4-2 output downstream optical signals. Specifically, the time synchronization control circuit 19 causes the optical transmitter 5-1 to output a downstream optical signal in a time slot corresponding to a first half of a predetermined cycle divided into two, and causes the optical transmitter 5-2 to output a downstream optical signal in a time slot corresponding to a second half of the predetermined cycle divided into two. The optical transmitter 5-1 of the optical transceiver 4-1 outputs (transmits) a generated downstream optical signal of the second wavelength ($\lambda$2) in the clockwise direction of the optical fiber 3-1 via an optical isolator 6-1 and an optical wavelength demultiplexing filter 7-1. Similarly, the optical transmitter 5-2 of the optical transceiver 4-2 outputs (transmits) a generated downstream optical signal of the second wavelength ($\lambda$2) in the counterclockwise direction of the optical fiber 3-2 via an optical isolator 6-2 and an optical wavelength demultiplexing filter 7-2.

The downstream optical signal of the second wavelength ($\lambda$2) transmitted in the clockwise direction via the optical fiber 3-1 reaches the optical coupler 14-1 of the slave station 2, and is input thereto. Furthermore, the downstream optical signal of the second wavelength ($\lambda$2) transmitted in the counterclockwise direction via the optical fiber 3-2 reaches the optical coupler 14-2 of the slave station 2, and is input thereto. The downstream optical signal branched by the optical coupler 14-1 and transmitted to the optical coupler 14-3 and the downstream optical signal branched by the optical coupler 14-2 and transmitted to the optical coupler 14-3 are multiplexed by the optical coupler 14-3, demultiplexed by the optical wavelength demultiplexing filter 12, and then received by the optical receiver 13.

Meanwhile, the downstream optical signal branched by the optical coupler 14-1 and transmitted to the optical coupler 14-2 is output to the optical fiber 3-2 via the optical coupler 14-2. Then, the downstream optical signal of the second wavelength ($\lambda$2) that has reached the optical transceiver 4-2 of the central station 1 passes through the optical wavelength demultiplexing filter 7-2, and is blocked by the optical isolator 6-2. In addition, the downstream optical signal branched by the optical coupler 14-2 and transmitted to the optical coupler 14-1 is output to the optical fiber 3-1 via the optical coupler 14-1. Then, the downstream optical signal of the second wavelength ($\lambda$2) that has reached the optical transceiver 4-1 of the central station 1 passes through the optical wavelength demultiplexing filter 7-1, and is blocked by the optical isolator 6-1.

FIG. 4 is a diagram showing examples of downstream optical signals to be output from the central station 1 and input to the slave station 2.

The time synchronization control circuit 19 of the central station 1 causes the optical transmitter 5-1 and the optical transmitter 5-2 to output downstream optical signals in different time slots into which a predetermined cycle is divided. For example, the optical transmitter 5-1 outputs a downstream optical signal A-1 in the clockwise direction in a time slot corresponding to a first half of a predetermined cycle divided into two (FIG. 4(A)). In addition, the optical transmitter 5-2 of the central station 1 outputs a downstream optical signal A-2 in the counterclockwise direction in a time slot corresponding to a second half of the predetermined cycle divided into two (FIG. 4(B)). The downstream optical signal A-1 output from the optical transmitter 5-1 and the downstream optical signal A-2 output from the optical transmitter 5-2 are the same in content. The time synchronization control circuit 19 may provide a guard band of a predetermined period of time between the timing for outputting the downstream optical signal A-1 and the timing for outputting the downstream optical signal A-2. The guard band prevents crosstalk and interference between the downstream optical signal A-1 and the downstream optical signal A-2.

The downstream optical signal A-1 output from the optical transmitter 5-1 of the central station 1 is input to the optical coupler 14-1 of the slave station 2 via the optical fiber 3-1. The downstream optical signal A-2 output from the optical transmitter 5-2 of the central station 1 is input to the optical coupler 14-2 of the slave station 2 via the optical fiber 3-2. The downstream optical signal A-1 branched by the optical coupler 14-1 and the downstream optical signal A-2 branched by the optical coupler 14-2 are multiplexed by the optical coupler 14-3. The multiplexed optical signals are arranged on a time-series basis as illustrated in FIG. 4(C). The multiplexed optical signals are demultiplexed by the optical wavelength demultiplexing filter 12 of the optical transceiver 9 and received by the optical receiver 13.

With the configuration above, even when an anomaly such as disconnection occurs in the optical fiber 3-2, the downstream optical signal A-1 output in the clockwise direction from the optical transmitter 5-1 of the central station 1 can reach the slave station 2 via the optical fiber 3-1. Similarly, even when an anomaly such as disconnection occurs in the optical fiber 3-1, the downstream optical signal A-2 output in the counterclockwise direction from the optical transmitter 5-2 of the central station 1 can reach the slave station 2 via the optical fiber 3-2.

Next, a description will be given of a mode in which an upstream optical signal is output from the slave station 2 toward the central station 1 (upstream direction). The time synchronization control circuit 20 of the slave station 2 adjusts the timing at which the optical transmitter 10 outputs (transmits) an upstream optical signal. The optical transmitter 10 of the slave station 2 generates an upstream optical signal B of the first wavelength ($\lambda 1$). The upstream optical signal B output from the optical transmitter 10 passes through the optical isolator 11 and the optical wavelength demultiplexing filter 12, and is branched into an optical signal B-1 and an optical signal B-2 by the optical coupler 14-3.

The upstream optical signal B-1 branched by the optical coupler 14-3 is output to the optical fiber 3-1 via the optical coupler 14-1. The upstream optical signal B-1 output to the optical fiber 3-1 is input to the optical transceiver 4-1 of the central station 1. The optical signal B-1 input to the optical transceiver 4-1 is demultiplexed and extracted by the optical wavelength demultiplexing filter 7-1, and then received by an optical receiver 8-1.

Meanwhile, the upstream optical signal B-2 branched by the optical coupler 14-3 is output to the optical fiber 3-2 via the optical coupler 14-2. The upstream optical signal B-2 output to the optical fiber 3-2 is input to the optical transceiver 4-2 of the central station 1. The upstream optical signal B-2 input to the optical transceiver 4-2 is demultiplexed and extracted by the optical wavelength demultiplexing filter 7-2, and then received by an optical receiver 8-2.

With the configuration above, even when an anomaly such as disconnection occurs in the optical fiber 3-1, the upstream optical signal B-2 output in the clockwise direction from the slave station 2 can reach the central station 1 via the optical fiber 3-2. Similarly, even when an anomaly such as disconnection occurs in the optical fiber 3-2, the upstream optical signal B-1 output in the counterclockwise direction from the slave station 2 can reach the central station 1 via the optical fiber 3-1.

As described above, since the network is constantly kept redundant, even when an anomaly such as disconnection occurs, it is not necessary to, for example, switch networks or change settings. Therefore, it is possible to reduce time taken to resume communication after disconnection of communication occurs.

Second Embodiment

A second embodiment is different from the first embodiment in that a single-fiber bidirectional optical ring system 100A includes two slave stations. The configuration of the central station 1 is the same as that in the first embodiment. Furthermore, the configurations of a slave station 2A and a slave station 2B are the same as the configuration of the slave station 2 in the first embodiment. Differences from the first embodiment will be described below.

FIG. 5 is a schematic diagram illustrating a configuration of the single-fiber bidirectional optical ring system 100A in the second embodiment.

The single-fiber bidirectional optical ring system 100A includes the central station 1, the slave station 2A, the slave station 2B, the optical fiber 3-1, the optical fiber 3-2, and an optical fiber 3-3. The central station 1 and the slave station 2A are connected by the optical fiber 3-1. The slave station 2A and the slave station 2B are connected by the optical fiber 3-3. The slave station 2B and the central station 1 are connected by the optical fiber 3-2. That is, the central station 1, the slave station 2A, and the slave station 2B are connected in a ring shape via the optical fibers 3-1 to 3-3. The optical fiber 3-1 is a part of the network 3 that connects the central station 1 and the slave station 2A. The optical fiber 3-2 is a part of the network 3 that connects the central station 1 and the slave station 2B. In addition, the optical fiber 3-3 is a part of the network 3 that connects the slave station 2A and the slave station 2B. That is, the central station 1, the slave station 2A, and the slave station 2B are connected by the network 3 that has been multiplexed (here, duplexed).

Note that the optical fibers 3-1 to 3-3 may be provided as part of a multi-core optical fiber. In addition, in a case where it is not necessary to describe the optical fibers 3-1 to 3-3 distinguished from one another, the optical fibers 3-1 to 3-3 will be simply referred to as the network 3. In the following description, a direction of transmission in the network 3 from the central station 1 to the slave station 2A, a direction of transmission in the network 3 from the slave station 2A to the slave station 2B, and a direction of transmission in the network 3 from the slave station 2B to the central station 1 are each referred to as a "clockwise" direction. Furthermore, a direction of transmission in the network 3 from the central station 1 to the slave station 2B, a direction of transmission in the network 3 from the slave station 2B to the slave station 2A, and a direction of transmission in the network 3 from the slave station 2A to the central station 1 are each referred to as a "counterclockwise" direction.

The configuration of the central station 1 is the same as the configuration of the central station 1 illustrated in FIG. 2 of the first embodiment. The central station 1 includes an optical transceiver 4-1, an optical transceiver 4-2, and a time synchronization control circuit 19. The optical transceiver 4-1 is connected to the slave station 2A via the optical fiber 3-1. In addition, the optical transceiver 4-2 is connected to the slave station 2B via the optical fiber 3-2.

The configurations of the slave station 2A and the slave station 2B are the same as the configuration of the slave station 2 illustrated in FIG. 3 of the first embodiment. In a case where it is not necessary to describe the slave station 2A and the slave station 2B distinguished from each other, the slave station 2A and the slave station 2B will be simply referred to as the slave stations 2 with the last alphabetical letters omitted. The slave station 2 includes an optical transceiver 9, an optical coupler 14-1, an optical coupler 14-2, an optical coupler 14-3, and a time synchronization control circuit 20. The time synchronization control circuit 20 adjusts a timing at which the optical transceiver 9 of each slave station 2 provided in the single-fiber bidirectional optical ring system 100A outputs an upstream optical signal. Specifically, the time synchronization control circuits 20 cause the optical transceivers 9 to transmit upstream optical signals in time slots into which a predetermined cycle is divided according to the number of the slave stations.

Next, operation will be described.

A description will be given of a mode in which downstream optical signals of a second wavelength ($\lambda 2$) are output from the central station 1 toward the slave stations 2A and 2B (downstream direction). The time synchronization control circuit 19 of the central station 1 adjusts timings at which the optical transmitter 5-1 of the optical transceiver 4-1 and the optical transmitter 5-2 of the optical transceiver 4-2 output downstream optical signals.

The optical transmitter 5-1 of the optical transceiver 4-1 outputs (transmits) a downstream optical signal of the second wavelength ($\lambda 2$) generated at the timing adjusted by the time synchronization control circuit 19 of the central station 1 to the optical fiber 3-1 in the clockwise direction of the network 3 via the optical isolator 6-1 and the optical wavelength demultiplexing filter 7-1.

Similarly, the optical transmitter 5-2 of the optical transceiver 4-2 outputs (transmits) a downstream optical signal of the second wavelength ($\lambda 2$) generated at the timing adjusted by the time synchronization control circuit 19 of the central station 1 to the optical fiber 3-2 in the counterclockwise direction of the network 3 via the optical isolator 6-2 and the optical wavelength demultiplexing filter 7-2.

The downstream optical signal of the second wavelength ($\lambda 2$) transmitted in the clockwise direction via the optical fiber 3-1 reaches the optical coupler 14-1 of the slave station 2A, and is input thereto. In addition, the downstream optical signal of the second wavelength ($\lambda 2$) transmitted in the counterclockwise direction via the optical fiber 3-3 reaches the optical coupler 14-2 of the slave station 2A, and is input thereto. The downstream optical signal branched by the optical coupler 14-1 of the slave station 2A and transmitted to the optical coupler 14-3 and the downstream optical signal branched by the optical coupler 14-2 and transmitted to the optical coupler 14-3 are multiplexed by the optical coupler 14-3, demultiplexed by the optical wavelength demultiplexing filter 12, and then received by the optical receiver 13.

Meanwhile, the downstream optical signal branched by the optical coupler 14-1 of the slave station 2A and transmitted to the optical coupler 14-2 is output to the optical fiber 3-3 in the clockwise direction via the optical coupler 14-2. In addition, the downstream optical signal branched by the optical coupler 14-2 of the slave station 2A and transmitted to the optical coupler 14-1 is output to the optical fiber 3-1 in the clockwise direction via the optical coupler 14-1.

The downstream optical signal of the second wavelength ($\lambda 2$) transmitted in the clockwise direction via the optical fiber 3-3 reaches the optical coupler 14-1 of the slave station 2B, and is input thereto. In addition, the downstream optical signal of the second wavelength ($\lambda 2$) transmitted in the counterclockwise direction via the optical fiber 3-2 reaches the optical coupler 14-2 of the slave station 2B, and is input thereto. The downstream optical signal branched by the optical coupler 14-1 of the slave station 2B and transmitted to the optical coupler 14-3 and the downstream optical signal branched by the optical coupler 14-2 and transmitted to the optical coupler 14-3 are multiplexed by the optical coupler 14-3, demultiplexed by the optical wavelength demultiplexing filter 12, and then received by the optical receiver 13.

Meanwhile, the downstream optical signal branched by the optical coupler 14-1 of the slave station 2B and transmitted to the optical coupler 14-2 is output to the optical fiber 3-2 in the clockwise direction via the optical coupler 14-2. In addition, the downstream optical signal branched by the optical coupler 14-2 of the slave station 2B and transmitted to the optical coupler 14-1 is output to the optical fiber 3-3 in the counterclockwise direction via the optical coupler 14-1.

The downstream optical signal of the second wavelength ($\lambda 2$) output from the optical transmitter 5-1 of the central station 1 and having completed a full circle through the network 3 in the clockwise direction reaches the optical transceiver 4-2, passes through the optical wavelength demultiplexing filter 7-2, and is blocked by the optical isolator 6-2. In addition, the downstream optical signal of the second wavelength ($\lambda 2$) output from the optical transmitter 5-2 of the central station 1 and having completed a full circle through the network 3 in the counterclockwise direction reaches the optical transceiver 4-1, passes through the optical wavelength demultiplexing filter 7-1, and is blocked by the optical isolator 6-1.

Figure 6:
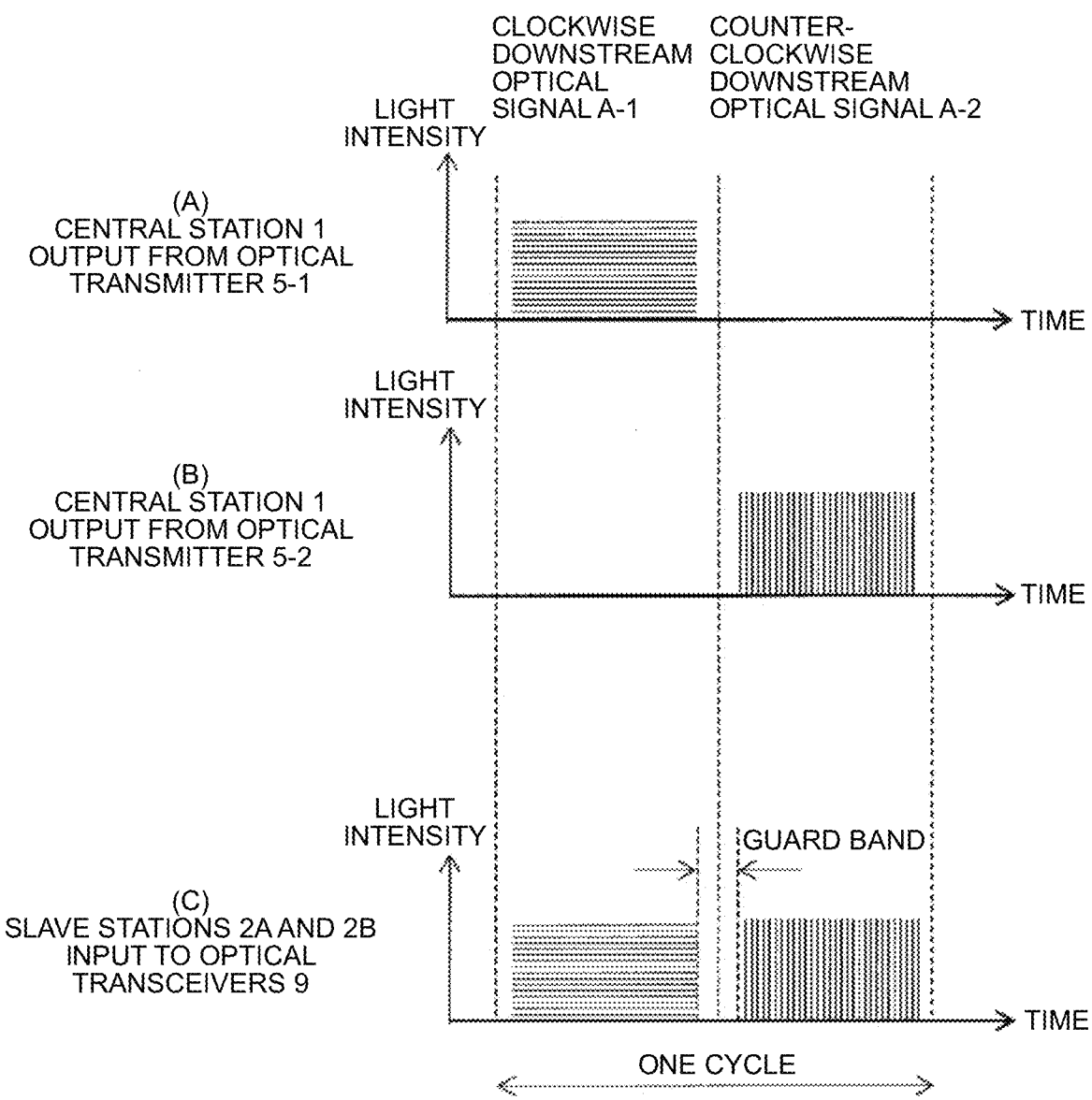
FIG. 6 is a diagram showing examples of downstream optical signals to be output from a central station and input to slave stations.

FIG. 6 is a diagram showing examples of downstream optical signals of the second wavelength to be output from the central station 1 and input to the slave stations 2A and 2B.

The time synchronization control circuit 19 of the central station 1 causes the optical transmitter 5-1 and the optical transmitter 5-2 to output downstream optical signals of the second wavelength in different time slots into which a predetermined cycle is divided. For example, the optical transmitter 5-1 generates the downstream optical signal A-1 to be output in the clockwise direction in a time slot corresponding to a first half of a predetermined cycle divided into two (FIG. 6(A)). In addition, the optical transmitter 5-2 of the central station 1 generates the downstream optical signal A-2 to be output in the counterclockwise direction in a time slot corresponding to a second half of the predetermined cycle divided into two (FIG. 6(B)). The downstream optical signal A-1 generated by the optical transmitter 5-1 and the downstream optical signal A-2 generated by the optical transmitter 5-2 are the same in content. The time synchronization control circuit 19 may provide a guard band of a predetermined period of time between the timing for outputting the downstream optical signal A-1 and the timing for outputting the downstream optical signal A-2.

The downstream optical signal A-1 output from the central station 1 in the clockwise direction is input to the optical coupler 14-1 of the slave station 2A. Furthermore, the downstream optical signal A-2 output from the central station 1 in the counterclockwise direction is input to the optical coupler 14-2 of the slave station 2A. Then, the downstream optical signal A-1 branched by the optical coupler 14-1 of the slave station 2A and the downstream optical signal A-2 branched by the optical coupler 14-2 of the slave station 2A are multiplexed by the optical coupler 14-3 of the slave station 2A. After being multiplexed, the downstream optical signal transmitted in the clockwise direction and having arrived and the downstream optical signal transmitted in the counterclockwise direction and having arrived are arranged on a time-series basis as illustrated in FIG. 6(C). The multiplexed downstream optical signals are demultiplexed by the optical wavelength demultiplexing filter 12 of the optical transceiver 9 of the slave station 2A and received by the optical receiver 13.

The downstream optical signal A-1 output from the central station 1 in the clockwise direction is input to the optical coupler 14-1 of the slave station 2B. Furthermore, the downstream optical signal A-2 output from the central station 1 in the counterclockwise direction is input to the optical coupler 14-2 of the slave station 2B. Then, the downstream optical signal A-1 branched by the optical coupler 14-1 of the slave station 2B and the downstream optical signal A-2 branched by the optical coupler 14-2 of the slave station 2B are multiplexed by the optical coupler 14-3 of the slave station 2B. After being multiplexed, the downstream optical signal transmitted in the clockwise direction and having arrived and the downstream optical signal transmitted in the counterclockwise direction and having arrived are arranged on a time-series basis as illustrated in FIG. 6(C). The multiplexed downstream optical signals are demultiplexed by the optical wavelength demultiplexing filter 12 of the optical transceiver 9 of the slave station 2B and received by the optical receiver 13.

With the configuration above, even when an anomaly such as disconnection occurs in the optical fiber 3-1, the downstream optical signal A-2 output in the counterclockwise direction from the central station 1 can reach the slave stations 2A and 2B. Similarly, even when an anomaly such as disconnection occurs in the optical fiber 3-2, the downstream optical signal A-1 output in the clockwise direction from the central station 1 can reach the slave stations 2A and 2B. Furthermore, even when an anomaly such as disconnection occurs in the optical fiber 3-3, the downstream optical signal A-1 output in the clockwise direction from the central station 1 can reach the slave station 2A, and the downstream optical signal A-2 output in the counterclockwise direction from the central station 1 can reach the slave station 2B.

Next, a description will be given of a mode in which an upstream optical signal is output from the slave station 2A toward the central station 1 (upstream direction) and from the slave station 2B toward the central station 1 (upstream direction). The time synchronization control circuits 20 of the slave stations 2A and 2B adjust timings at which the optical transmitters 10 of the optical transceivers 9 output upstream optical signals.

The optical transceiver 9 (optical transmitter 10) of the slave station 2A outputs an upstream optical signal of a first wavelength (λ1) generated at the timing adjusted by the time synchronization control circuit 20. The upstream optical signal output from the optical transmitter 10 of the slave station 2A passes through the optical isolator 11 and the optical wavelength demultiplexing filter 12, and is branched by the optical coupler 14-3.

The upstream optical signal branched by the optical coupler 14-3 of the slave station 2A is output in the counterclockwise direction to the optical fiber 3-1 via the optical coupler 14-1. The upstream optical signal output to the optical fiber 3-1 is input to the optical transceiver 4-1 of the central station 1. The upstream optical signal input to the optical transceiver 4-1 is demultiplexed and extracted by the optical wavelength demultiplexing filter 7-1, and then received by the optical receiver 8-1.

Furthermore, the upstream optical signal branched by the optical coupler 14-3 of the slave station 2A is output in the clockwise direction to the optical fiber 3-3 via the optical coupler 14-2. The upstream optical signal output to the optical fiber 3-3 passes through the optical coupler 14-1 and the optical coupler 14-2 of the slave station 2B, and the optical fiber 3-2, and is input to the optical transceiver 4-2 of the central station 1. The upstream optical signal input to the optical transceiver 4-2 is demultiplexed and extracted by the optical wavelength demultiplexing filter 7-2, and then received by the optical receiver 8-2.

Similarly, the optical transceiver 9 (optical transmitter 10) of the slave station 2B outputs an upstream optical signal of the first wavelength (λ1) generated at the timing adjusted by the time synchronization control circuit 20. The upstream optical signal output from the optical transmitter 10 of the slave station 2B passes through the optical isolator 11 and the optical wavelength demultiplexing filter 12, and is branched by the optical coupler 14-3.

The upstream optical signal branched by the optical coupler 14-3 of the slave station 2B is output in the counterclockwise direction to the optical fiber 3-3 via the optical coupler 14-1. The upstream optical signal output to the optical fiber 3-3 passes through the optical coupler 14-2 and the optical coupler 14-1 of the slave station 2A, and the optical fiber 3-1, and is input to the optical transceiver 4-1 of the central station 1. The upstream optical signal input to the optical transceiver 4-1 is demultiplexed and extracted by the optical wavelength demultiplexing filter 7-1, and then received by the optical receiver 8-1.

Furthermore, the upstream optical signal branched by the optical coupler 14-3 of the slave station 2B is output in the clockwise direction to the optical fiber 3-2 via the optical coupler 14-2. The upstream optical signal output to the optical fiber 3-2 is input to the optical transceiver 4-2 of the central station 1. The upstream optical signal input to the optical transceiver 4-2 is demultiplexed and extracted by the optical wavelength demultiplexing filter 7-2, and then received by the optical receiver 8-2.

Note that the upstream optical signal of the first wavelength having reached the slave station 2B from the slave station 2A via the optical fiber 3-3 and branched by the optical coupler 14-1 of the slave station 2B passes through the optical coupler 14-3 and the optical wavelength demultiplexing filter 12, and is blocked by the optical isolator 11.

Similarly, the upstream optical signal of the first wavelength having reached the slave station 2A from the slave station 2B via the optical fiber 3-3 and branched by the optical coupler 14-2 of the slave station 2A passes through the optical coupler 14-3 and the optical wavelength demultiplexing filter 12, and is blocked by the optical isolator 11.

Figure 7:
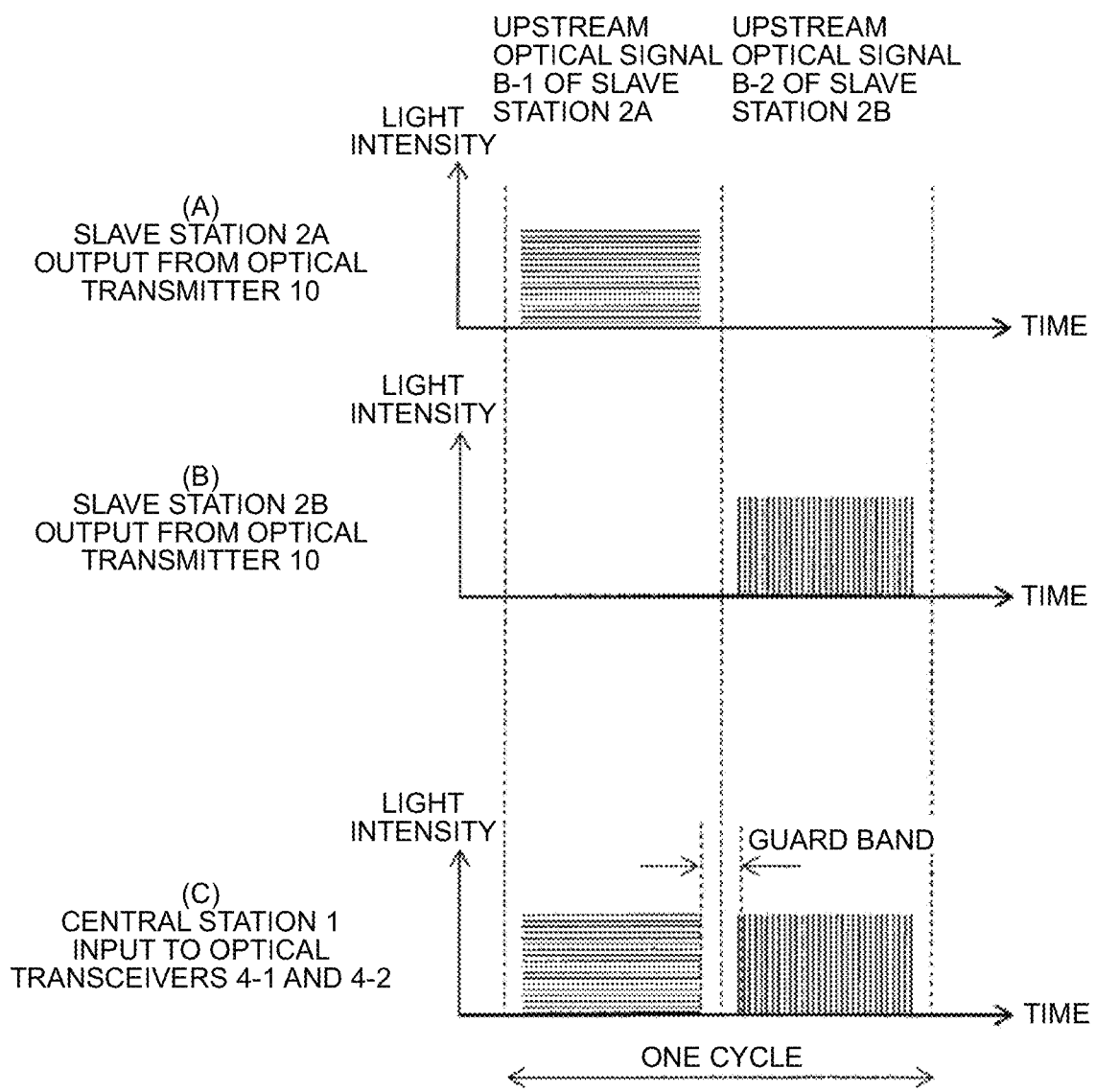
FIG. 7 is a diagram showing examples of upstream optical signals to be output from the slave stations and input to the central station.

FIG. 7 is a diagram showing examples of upstream optical signals to be output from the slave stations 2A and 2B and input to the central station 1.

The time synchronization control circuits 20 of the slave station 2A and the slave station 2B adjust a timing at which the slave station 2A outputs an upstream optical signal and a timing at which the slave station 2B outputs an upstream optical signal. Specifically, the time synchronization control circuits 20 of the slave station 2A and the slave station 2B cause the slave station 2A and the slave station 2B to output upstream optical signals in different time slots into which a predetermined cycle is divided according to the number of the slave stations. Here, the optical transmitter 10 of the slave station 2A outputs the upstream optical signal B-1 in a time slot corresponding to a first half of a predetermined cycle divided into two which is the number of the slave stations (FIG. 7(A)). In addition, the optical transmitter 10 of the slave station 2B outputs the upstream optical signal B-2 in a time slot corresponding to a second half of the predetermined cycle divided into two which is the number of the slave stations (FIG. 7(B)). Furthermore, the time synchronization control circuits 20 of the slave station 2A and the slave station 2B may adjust the timing at which the slave station 2A outputs the upstream optical signal B-1 and the timing at which the slave station 2B outputs the upstream optical signal B-2, and provide a guard band of a predetermined period of time between the timings.

The upstream optical signal B-1 of the first wavelength (λ1) output from the optical transmitter 10 of the slave station 2A is branched by the optical coupler 14-3. The branched upstream optical signal B-1 is output from the optical coupler 14-1 to the optical fiber 3-1 in the counterclockwise direction, and is input to the optical transceiver 4-1 of the central station 1. Furthermore, the upstream optical signal B-1 branched by the optical coupler 14-3 of the slave station 2A is output from the optical coupler 14-2 to the optical fiber 3-3 in the clockwise direction, and is input to the optical coupler 14-1 of the slave station 2B via the optical fiber 3-3. Then, the upstream optical signal B-1 input to the optical coupler 14-1 of the slave station 2B and the upstream optical signal B-2 output from the optical transceiver 9 of the slave station 2B are multiplexed by the optical coupler 14-2. After being multiplexed, the upstream optical signals output from the slave station 2A and the slave station 2B are arranged on a time-series basis (FIG. 7(C)).

Furthermore, the upstream optical signal B-2 of the first wavelength (λ1) output from the optical transmitter 10 of the slave station 2B is branched by the optical coupler 14-3. The branched upstream optical signal B-2 is output from the optical coupler 14-2 to the optical fiber 3-2 in the clockwise direction, and is input to the optical transceiver 4-2 of the central station 1. In addition, the upstream optical signal B-2 branched by the optical coupler 14-3 of the slave station 2B is output from the optical coupler 14-1 to the optical fiber 3-3 in the counterclockwise direction, and is input to the optical coupler 14-2 of the slave station 2A via the optical fiber 3-3. Then, the upstream optical signal B-2 input to the optical coupler 14-2 of the slave station 2A and the upstream optical signal B-1 output from the optical transceiver 9 of the slave station 2A are multiplexed by the optical coupler 14-1. After being multiplexed, the upstream optical signals output from the slave station 2A and the slave station 2B are arranged on a time-series basis (FIG. 7(C)).

The upstream optical signals that have reached the optical transceiver 4-1 of the central station 1 from the optical fiber 3-1 are demultiplexed and extracted by the optical wavelength demultiplexing filter 7-1, and then received by the optical receiver 8-1. Similarly, the upstream optical signals that have reached the optical transceiver 4-2 of the central station 1 from the optical fiber 3-2 are demultiplexed and extracted by the optical wavelength demultiplexing filter 7-2, and then received by the optical receiver 8-2.

With the configuration above, even when an anomaly such as disconnection occurs in the optical fiber 3-1, the upstream optical signals output in the clockwise direction from the slave stations 2A and 2B can reach the central station 1 via the optical fiber 3-2. Similarly, even when an anomaly such as disconnection occurs in the optical fiber 3-2, the upstream optical signals output in the counterclockwise direction from the slave stations 2A and 2B can reach the central station 1 via the optical fiber 3-1. Furthermore, even when an anomaly such as disconnection occurs in the optical fiber 3-3, the upstream optical signal output in the counterclockwise direction from the slave station 2A can reach the central station 1 via the optical fiber 3-1, and the upstream optical signal output in the clockwise direction from the slave station 2B can reach the central station 1 via the optical fiber 3-2.

As described above, since the network is constantly kept redundant, even when an anomaly such as disconnection occurs, it is not necessary to, for example, switch networks or change settings. Therefore, it is possible to reduce time taken to resume communication after disconnection of communication occurs. In addition, since it is not necessary to assign different encoding methods or optical wavelengths to the slave stations, it is possible to construct a redundant network with a simple configuration.

The number of slave stations is two in the present embodiment. However, the number of slave stations is not limited as long as the number of divided time slots for upstream optical signals is equal to the number of slave stations. It is possible to construct a network including a larger number of slave stations by using a wavelength multiplexing technique, a spatial multiplexing technique, or the like. In addition, the configurations of the slave station 2A and the slave station 2B are the same. Furthermore, the optical transceiver 4 of the central station 1 and the optical transceiver 9 of the slave station 2 differ from each other only in the wavelengths of signals to be transmitted from the optical transmitters and the wavelengths of signals that pass through or are demultiplexed by the optical wavelength demultiplexing filters. Therefore, it is possible to construct a redundant single-fiber bidirectional optical ring system more easily than in the conventional techniques. Furthermore, since active and backup optical signals are constantly transmitted in the clockwise and counterclockwise directions, it is possible to achieve early recovery without switching paths even when a transmission path failure occurs.

Third Embodiment

The above-described embodiments are merely examples of embodying the present invention, and it is possible to give application examples in which addition or modification has been made to the configurations as follows. An embodiment in which a plurality of single-fiber bidirectional optical ring systems shares a time synchronization control circuit 21 of the central station 1 is illustrated in a third embodiment.

Figure 8:
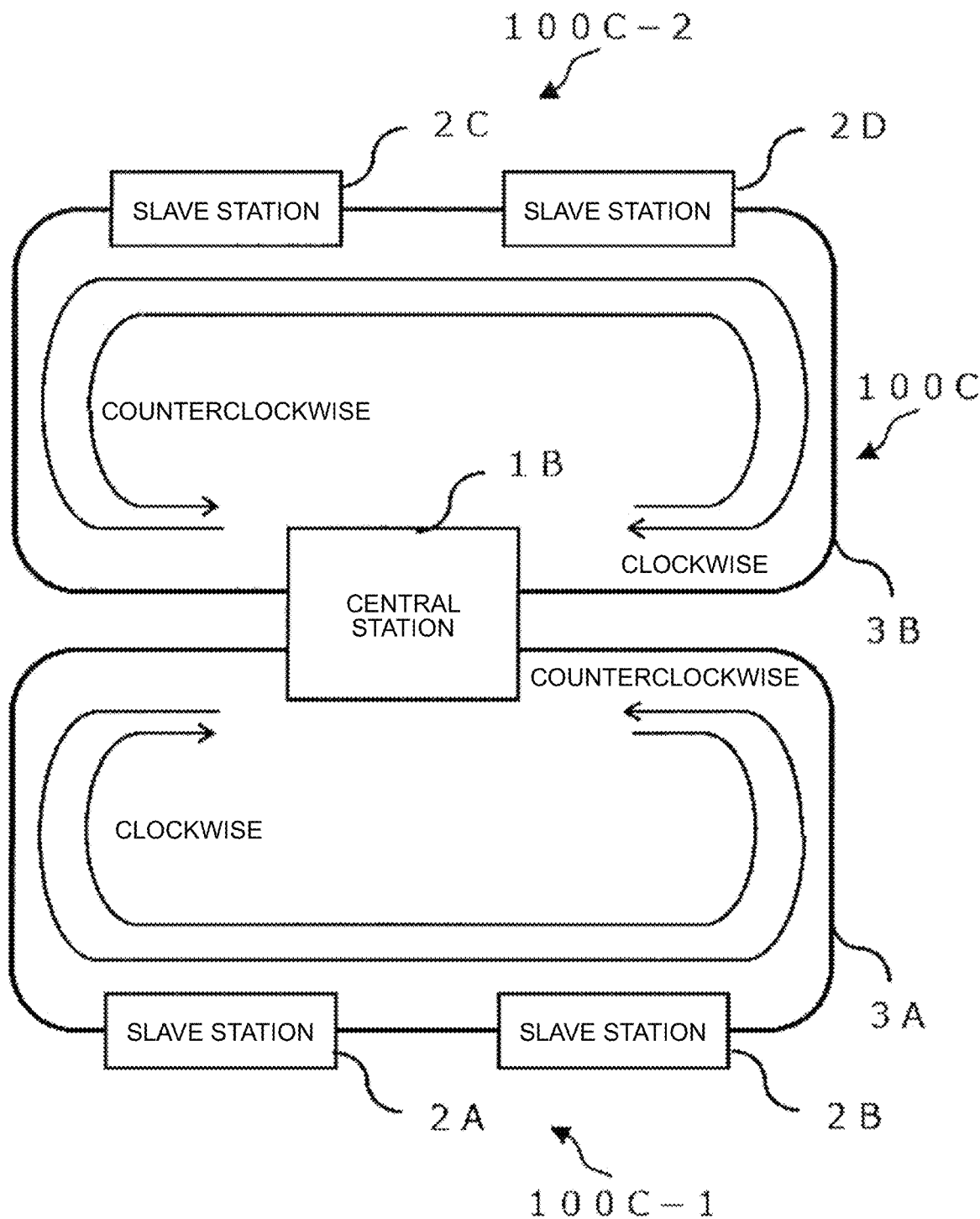
FIG. 8 is a schematic diagram illustrating a configuration of a single-fiber bidirectional optical ring system.

FIG. 8 is a schematic diagram illustrating a configuration of a single-fiber bidirectional optical ring system 100C in the third embodiment.

The single-fiber bidirectional optical ring system 100C includes a central station 1B, the slave station 2A, the slave station 2B, a slave station 2C, a slave station 2D, a network 3A including optical fibers, and a network 3B including optical fibers. The central station 1B, the slave station 2A, and the slave station 2B are connected in a ring shape via the network 3A, and forms a single-fiber bidirectional optical ring system 100C-1. In addition, the central station 1B, the slave station 2C, and the slave station 2D are connected in a ring shape via the network 3B, and forms a single-fiber bidirectional optical ring system 100C-2.

As illustrated in FIG. 8, a direction of a communication path connecting the central station 1B, the slave station 2B, and the slave station 2A in this order via the network 3A is referred to as a "clockwise" direction. In addition, a direction of a communication path connecting the central station 1B, the slave station 2A, and the slave station 2B in this order via the network 3A is referred to as a "counterclockwise" direction. Similarly, a direction of a communication path connecting the central station 1B, the slave station 2C, and the slave station 2D in this order via the network 3B is referred to as the "clockwise" direction. In addition, a direction of a communication path connecting the central station 1B, the slave station 2D, and the slave station 2C in this order via the network 3B is referred to as the "counterclockwise" direction.

Figure 9:
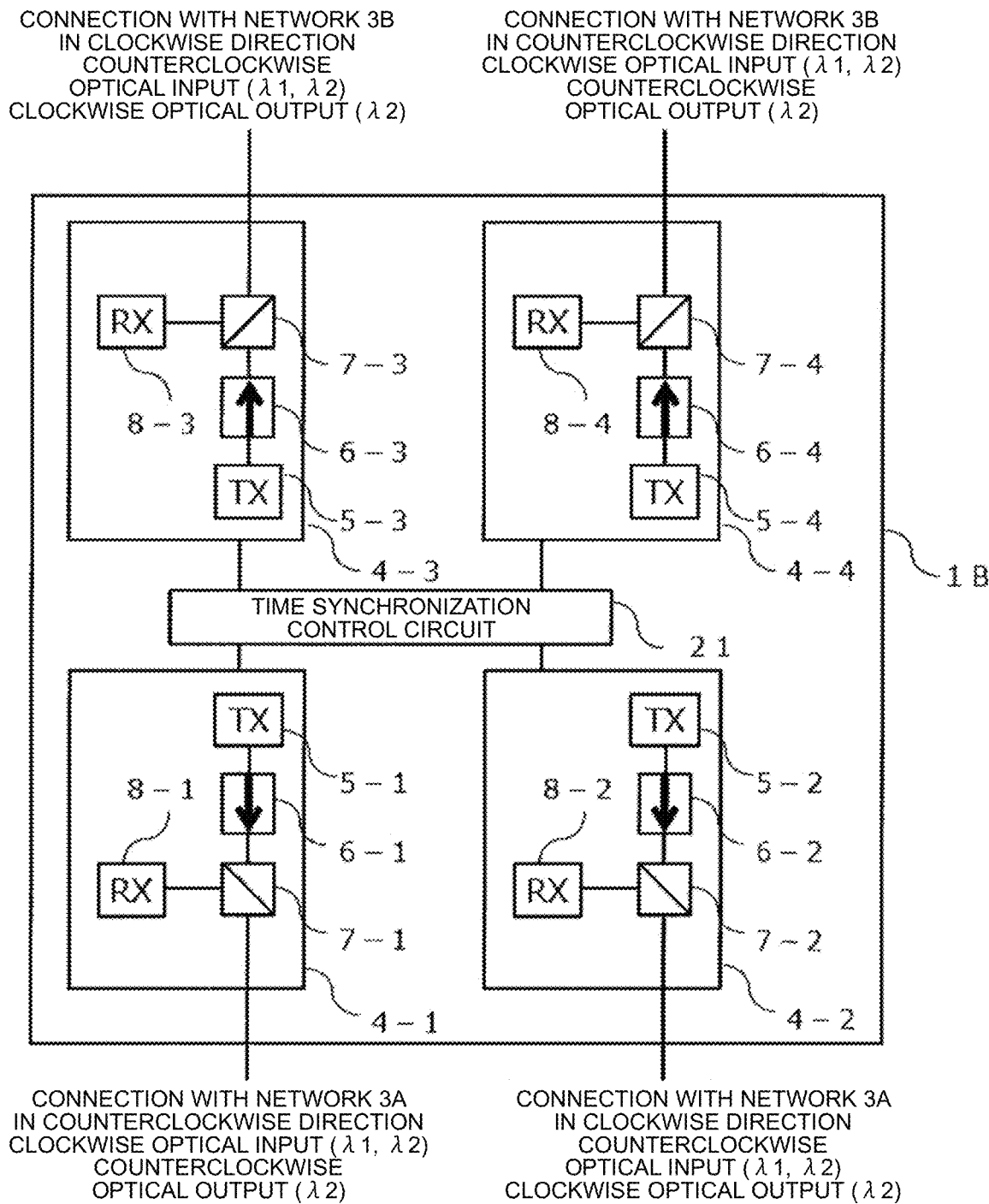
FIG. 9 is a schematic configuration diagram illustrating connection between a central station and networks.

FIG. 9 is a schematic configuration diagram illustrating connection between the central station 1B and the networks 3A and 3B.

The central station 1B includes the optical transceivers 4-1 and 4-2, optical transceivers 4-3 and 4-4, and the time synchronization control circuit 21. The optical transceivers 4-1 and 4-2 are connected to the network 3A including optical fibers. Specifically, the optical transceiver 4-1 is connected to an optical fiber in the counterclockwise direction of the network 3A. The optical transceiver 4-2 is connected to an optical fiber in the clockwise direction of the network 3A. Therefore, the optical transceivers 4-1 and 4-2 are given as an example of a pair of single-fiber bidirectional optical transceivers corresponding to the single-fiber bidirectional optical ring system 100C-1. Furthermore, the optical transceivers 4-3 and 4-4 are connected to the network 3B including optical fibers. Specifically, the optical transceiver 4-3 is connected to an optical fiber in the clockwise direction of the network 3B. The optical transceiver 4-4 is connected to an optical fiber in the counterclockwise direction of the network 3B. Therefore, the optical transceivers 4-3 and 4-4 are given as an example of a pair of single-fiber bidirectional optical transceivers corresponding to the single-fiber bidirectional optical ring system 100C-2. The time synchronization control circuit 21 that adjusts the timing for outputting a downstream optical signal is connected to each of the optical transceivers 4-1, 4-2, 4-3, and 4-4.

The time synchronization control circuit 21 is an example of the first time synchronization control circuit, and is shared by the single-fiber bidirectional optical ring systems 100C-1 and 100C-2. In addition, the time synchronization control circuit 21 adjusts the timings for outputting downstream optical signals of a second wavelength for each of the pairs of optical transceivers corresponding to the single-fiber bidirectional optical ring systems 100C-1 and 100C-2. Specifically, the time synchronization control circuit 21 causes the optical transceiver 4-1 and the optical transceiver 4-2 to output downstream optical signals in different time slots into which a predetermined cycle is divided. In addition, the time synchronization control circuit 21 causes the optical transceiver 4-3 and the optical transceiver 4-4 to output downstream optical signals in different time slots into which the predetermined cycle is divided. Operation of each of the single-fiber bidirectional optical ring systems 100C-1 and 100C-2 is the same as the operation described in the second embodiment, and thus the description thereof will be omitted.

Connection between optical transceivers of the slave stations 2A and 2B and the network 3A and connection between optical transceivers of the slave stations 2C and 2D and the network 3B are the same as connection illustrated in FIG. 3 of the first embodiment. Therefore, the description thereof will be omitted.

Note that the example in which the two single-fiber bidirectional optical ring systems are constructed has been described in the third embodiment, but three or more single-fiber bidirectional optical ring systems may be constructed. It is possible to achieve a redundant single-fiber bidirectional optical ring system which is simple and capable of shortening restoration time, by causing the operation described in the second embodiment to be performed for each of the single-fiber bidirectional optical ring systems.

Fourth Embodiment

In each of the above-described embodiments, the single-fiber bidirectional optical ring system includes the single central station. However, the single-fiber bidirectional optical ring system may include a plurality of central stations connected in parallel to the network.

Figure 10:
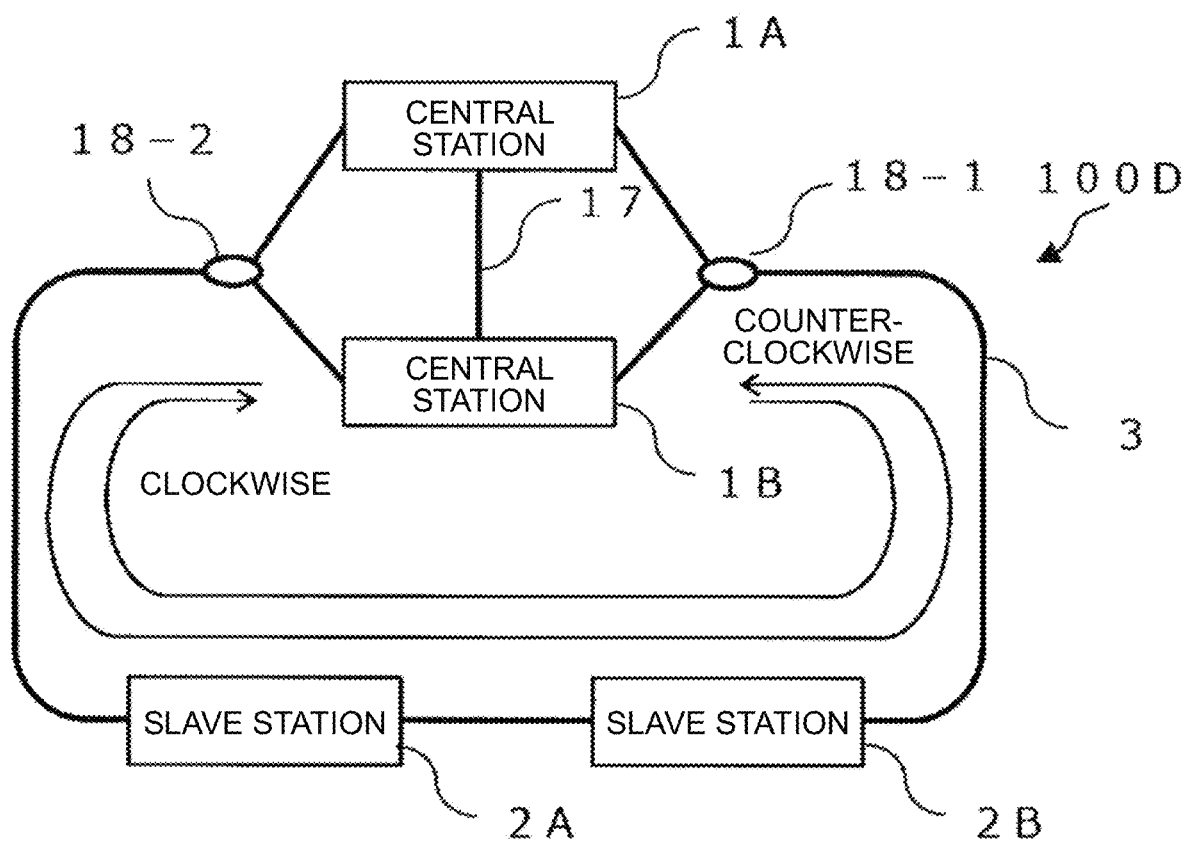
FIG. 10 is a schematic diagram illustrating a configuration of a single-fiber bidirectional optical ring system.

FIG. 10 is a schematic diagram illustrating a configuration of a single-fiber bidirectional optical ring system 100D in a fourth embodiment.

The single-fiber bidirectional optical ring system 100D includes a central station 1A, the central station 1B, optical couplers 18-1 and 18-2, the slave stations 2A and 2B, and the network 3 including optical fibers. In the single-fiber bidirectional optical ring system 100D, the central stations 1A and 1B are connected in parallel with respect to the network 3. The central station 1A and the central station 1B are connected by an optical fiber 17.

The configurations of the central stations 1A and 1B are the same as the configuration of the central station 1 illustrated in FIG. 2 of the first embodiment. Each of the central stations 1A and 1B includes the optical transceiver 4-1 (optical transmitter 5-1), the optical transceiver 4-2 (optical transmitter 5-2), and the time synchronization control circuit 19. The optical transceiver 4-1 of the central station 1A is connected to the network 3 via the optical coupler 18-1. In addition, the optical transceiver 4-2 of the central station 1A is connected to the network 3 via the optical coupler 18-2. Similarly, the optical transceiver 4-1 of the central station 1B is connected to the network 3 via the optical coupler 18-1. In addition, the optical transceiver 4-2 of the central station 1B is connected to the network 3 via the optical coupler 18-2. Since connection between the optical transceiver of each slave station and the network 3 is the same as that in FIG. 3, the description thereof will be omitted.

Figure 11:
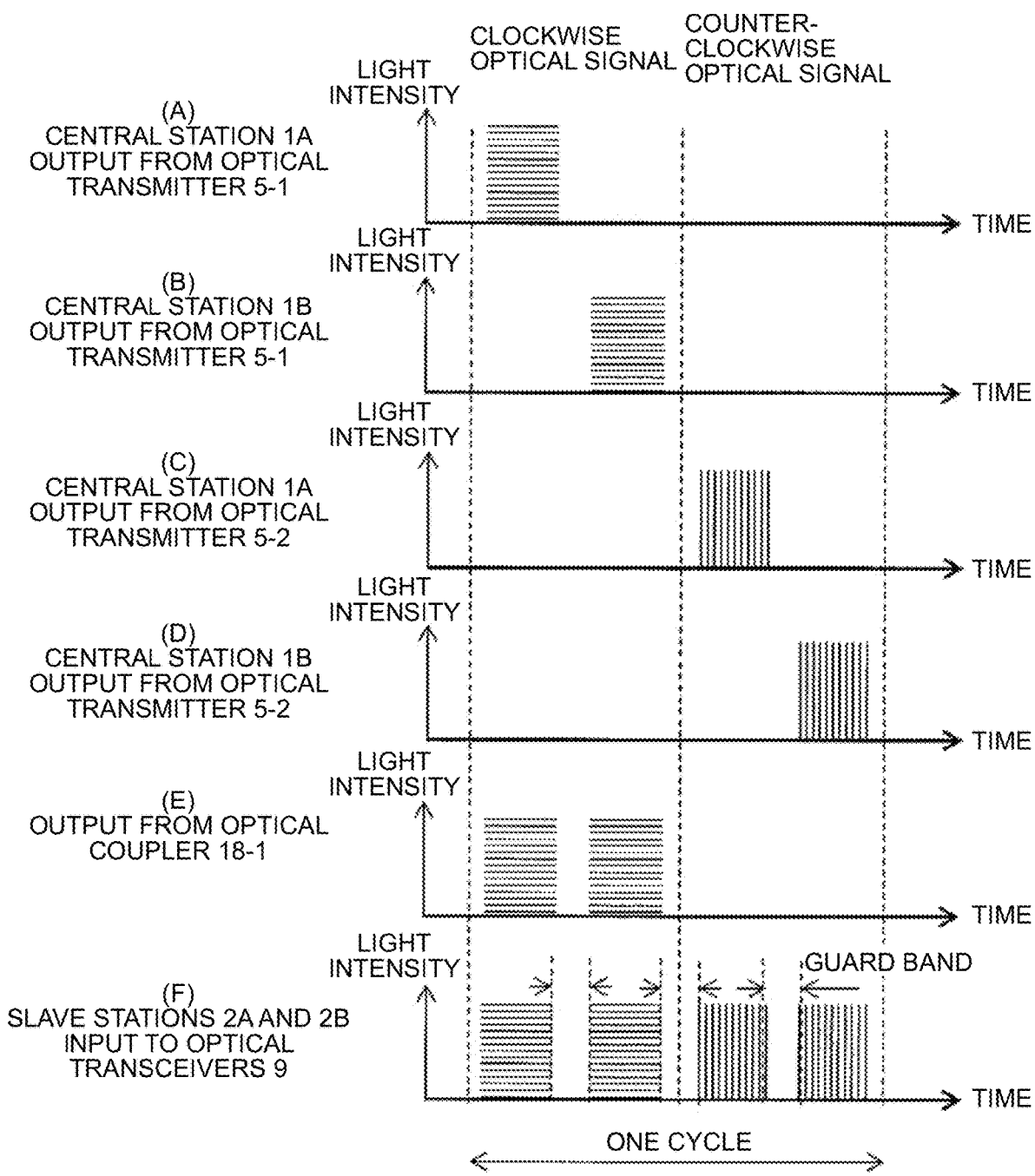
FIG. 11 is a diagram showing examples of downstream optical signals to be output from central stations and input to slave stations.

FIG. 11 is a diagram showing examples of downstream optical signals to be output from the central stations 1A and 1B and input to the slave stations 2A and 2B.

In the fourth embodiment, each of the central stations 1A and 1B includes a pair of optical transceivers (examples of the single-fiber bidirectional optical transceivers). Therefore, the time synchronization control circuits 19 (examples of the first time synchronization control circuits) of the central stations 1A and 1B cause the optical transceivers to output (transmit) downstream optical signals in different time slots into which a predetermined cycle is divided according to the total number (four) of the optical transceivers. In the following description, four time slots into which the predetermined cycle is divided are referred to as a first time slot, a second time slot, a third time slot, and a fourth time slot in order of time.

The optical transceiver 4-1 (optical transmitter 5-1) of the central station 1A outputs a downstream optical signal directed in a clockwise direction of the network 3 in the first time slot (FIG. 11(A)). The optical transceiver 4-2 (optical transmitter 5-2) of the central station 1A outputs a downstream optical signal directed in a counterclockwise direction of the network 3 in the third time slot (FIG. 11(C)). The optical transceiver 4-1 (optical transmitter 5-1) of the central station 1B outputs a downstream optical signal directed in the clockwise direction of the network 3 in the second time slot (FIG. 11(B)). The optical transceiver 4-2 (optical transmitter 5-2) of the central station 1B outputs a downstream optical signal directed in the counterclockwise direction of the network 3 in the fourth time slot (FIG. 11(D)). Note that the time slot in which each optical transceiver outputs a downstream optical signal is not limited to the above-described time slot. At least, the optical transceivers just need to output downstream optical signals in different time slots into which a predetermined cycle is divided.

The time synchronization control circuit 19 of the central station 1A and the time synchronization control circuit 19 of the central station 1B may adjust timings at which the respective optical transceivers output downstream optical signals, and provide a guard band of a predetermined period of time between the downstream optical signals.

The optical coupler 18-1 multiplexes (FIG. 11(E)) the downstream optical signal (FIG. 11(A)) output from the optical transceiver 4-1 (optical transmitter 5-1) of the central station 1A and the downstream optical signal (FIG. 11(B)) output from the optical transceiver 4-1 (optical transmitter 5-1) of the central station 1B. Similarly, the optical coupler 18-2 multiplexes the downstream optical signal (FIG. 11(C)) output from the optical transceiver 4-2 (optical transmitter 5-2) of the central station 1A and the downstream optical signal (FIG. 11(D)) output from the optical transceiver 4-2 (optical transmitter 5-2) of the central station 1B.

In each of the slave stations 2A and 2B, the clockwise downstream optical signals and the counterclockwise downstream optical signals are input to the optical coupler 14-1 and the optical coupler 14-2, respectively, and multiplexed by the optical coupler 14-3. After being multiplexed, the downstream optical signals transmitted in the clockwise direction and having arrived and the downstream optical signals transmitted in the counterclockwise direction and having arrived are arranged on a time-series basis (FIG. 11(F)). The multiplexed downstream optical signals are demultiplexed by the optical wavelength demultiplexing filter 12 and then received by the optical receiver 13.

With the configuration above, even when an anomaly such as disconnection occurs in an optical fiber between the central stations and a slave station or the optical fiber between the slave stations, the clockwise downstream optical signals or the counterclockwise downstream optical signals output from the central stations can reach the slave stations. Furthermore, since the network is constantly kept redundant, even when an anomaly occurs, it is not necessary to, for example, switch networks or change settings, so that it does not require time to resume communication after disconnection of communication occurs.

When upstream optical signals are output from the slave stations 2A and 2B to the central stations 1A and 1B, the identical upstream optical signals branched by the optical couplers 18-1 and 18-2 reach the central stations 1A and 1B. In addition, the central stations 1A and 1B periodically perform mirroring via the optical fiber 17. Here, examples of information to be mirrored include various types of information set in the central stations 1A and 1B in addition to information indicated by input or output optical signals. Therefore, the central stations 1A and 1B can operate as active/backup stations, or operate complementarily.

With the configuration above, even when an anomaly such as disconnection occurs in an optical fiber between the central stations and a slave station or the optical fiber between the slave stations, clockwise upstream optical signals or counterclockwise upstream optical signals output from the slave stations can reach the central stations. Furthermore, since the network is constantly kept redundant, even when an anomaly occurs, it is not necessary to, for example, switch networks or change settings, so that it does not require time to resume communication after disconnection of communication occurs.

Other Application Examples

Guard Band

The time synchronization control circuits 19 and 20 may provide, as guard bands, intervals for making optical signals received by the optical receivers 8 and 13 distinguishable. For example, the time synchronization control circuits 19 and 20 may each set the length of the guard band according to the difference in path length (optical fiber length) between two optical signals, that is, an optical signal that is transmitted from the central station 1 in the clockwise direction and reaches the slave station 2 and an optical signal that is transmitted from the central station 1 in the counterclockwise direction and reaches the slave station 2. When the difference in path length is 10 m, the difference in arrival time to be caused by the difference in path length can be estimated to be about 50 nanoseconds. At least, a guard band may be set which has a length equal to or greater than the difference in arrival time. In addition, the time synchronization control circuits 19 and 20 may calculate the sum of a period of time during which laser light is emitted, a period of time during which laser light is not emitted, a period of time for the optical receivers 8 and 13 to perform synchronous reproduction, and the like, in the case of generating a bursty optical signal, according to the accuracy of time in the time synchronization control circuits 19 and 20, and set a guard band having a length at least equal to or greater than the sum. In addition, the time synchronization control circuits 19 and 20 may perform control based on, for example, time based on relative time at which the time of the central station 1 is distributed to each slave station 2, or absolute time determined by individually measuring by global positioning system (GPS) receivers provided in the central station 1 and each slave station 2, and set the length of the guard band according to each accuracy of the relative time or the absolute time.

Figure 12:
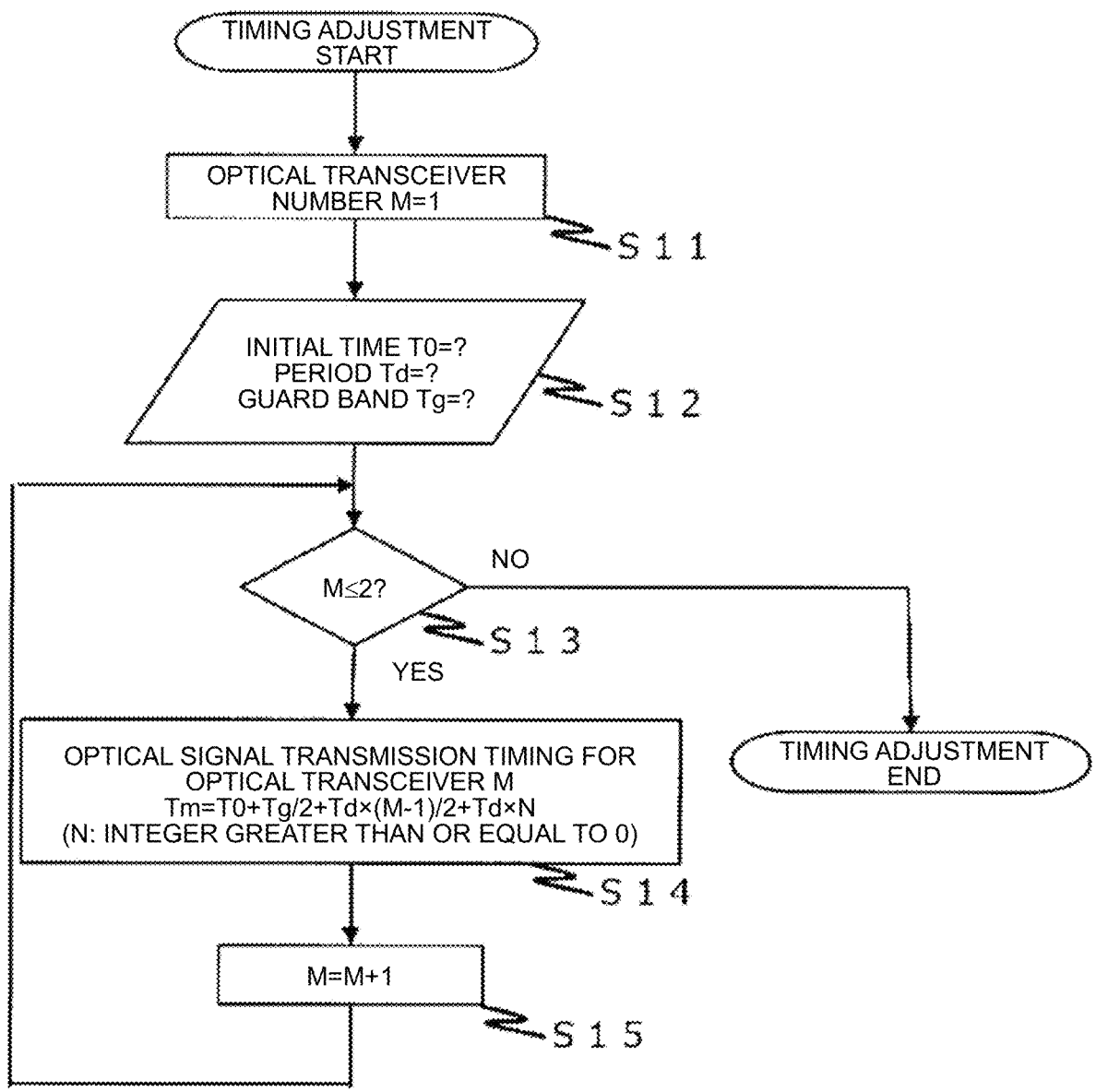
FIG. 12 is a flowchart illustrating a process in which a time synchronization control circuit of the central station adjusts timings for causing optical transceivers to output downstream optical signals.

Process in which the time synchronization control circuit 19 of the central station 1 adjusts timings for causing the optical transceivers to output downstream optical signals FIG. 12 is a flowchart illustrating a process in which the time synchronization control circuit 19 of the central station 1 adjusts timings for causing the optical transceivers 4 to output downstream optical signals.

The time synchronization control circuit 19 of the central station 1 sets 1 as an initial value of an optical transceiver number M (step S11).

The time synchronization control circuit 19 of the central station 1 sets a value for each of initial time T0, a period Td, and a guard band Tg (step S12). Here, the time synchronization control circuit 19 of the central station 1 may read the values to be set from a memory (not illustrated), or may receive the values to be set from an administrator or the like of the central station 1.

When the optical transceiver number M is equal to or less than the total number (2 in the second embodiment) of the optical transceivers 4 included in the central station 1 provided in the single-fiber bidirectional optical ring system in step S13, the time synchronization control circuit 19 of the central station 1 calculates an optical signal transmission timing Tm for the optical transceiver 4 corresponding to the optical transceiver number M on the basis of formula (1) (step S14).

$$Tm = T0 + Tg/2 + Td \times (M-1)/2 + Td \times N \qquad \text{Formula (1)}$$

(N: an integer greater than or equal to 0)

The time synchronization control circuit 19 of the central station 1 increments the optical transceiver number M by 1 (step S15).

When the optical transceiver number M is greater than the total number (2 in the second embodiment) of the optical transceivers 4 included in the central station 1 provided in the single-fiber bidirectional optical ring system in step S13, the time synchronization control circuit 19 of the central station 1 ends adjustment of the optical signal transmission timings Tm for the optical transceivers 4.

Note that when a plurality of the central stations 1 is included in the single-fiber bidirectional optical ring system as in the fourth embodiment, the time synchronization control circuit 19 of a certain central station 1 may adjust not only the optical signal transmission timings Tm for the optical transceivers 4 included in the certain central station 1 but also the optical signal transmission timings Tm for the optical transceivers 4 included in another central station 1. Then, the time synchronization control circuit 19 of the certain central station 1 may transmit results of adjusting the optical signal transmission timings Tm to the time synchronization control circuit 19 of the another central station 1 by using a known communication method.

Figure 13:
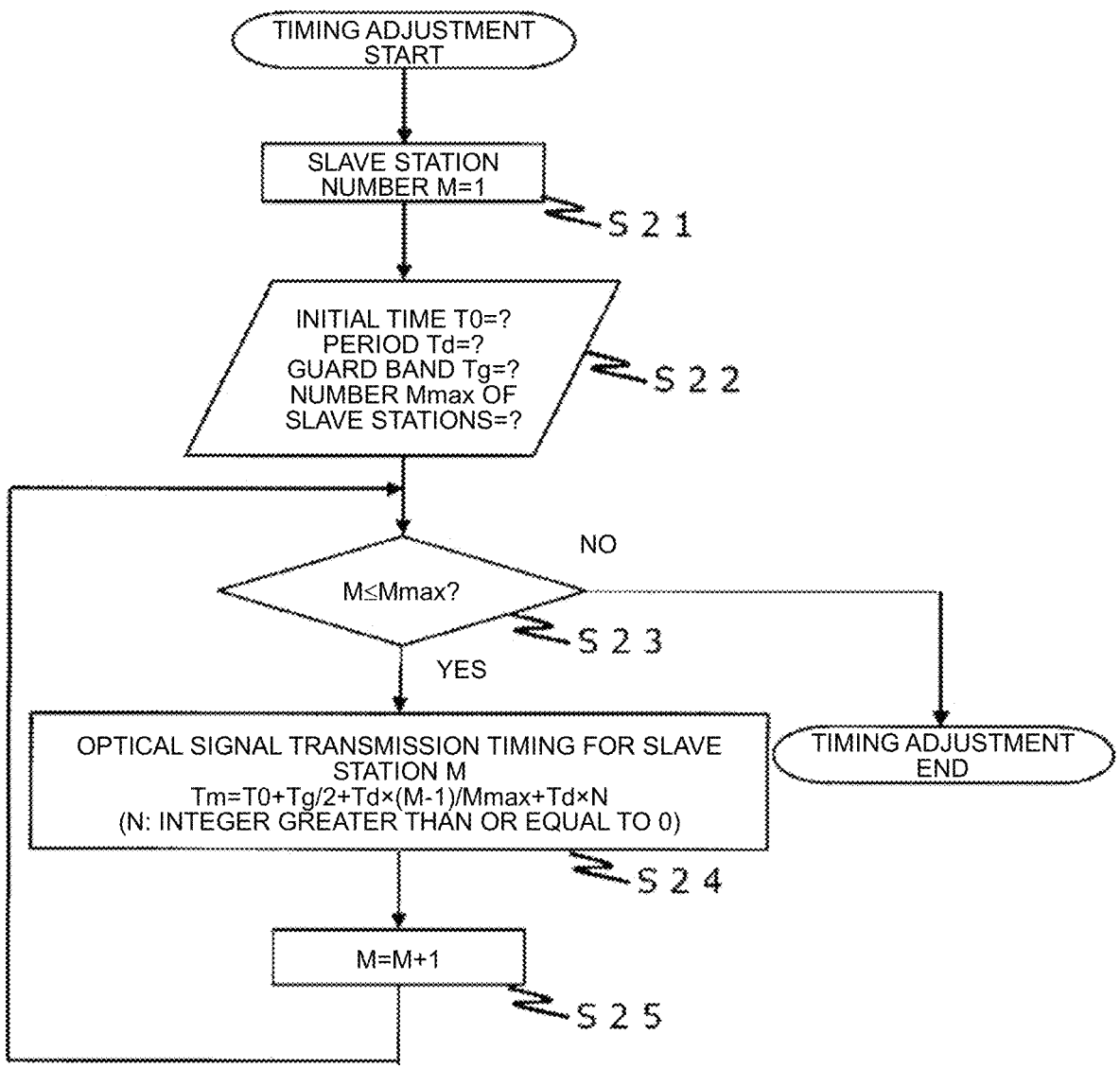
FIG. 13 is a flowchart illustrating a process in which a time synchronization control circuit of the slave station adjusts a timing for causing an optical transceiver to output an upstream optical signal.

Process in which the time synchronization control circuit 20 of the slave station 2 adjusts a timing for causing the optical transceiver 9 to output an upstream optical signal FIG. 13 is a flowchart illustrating a process in which the time synchronization control circuit 20 of the slave station 2 adjusts a timing for causing the optical transceiver 9 to output an upstream optical signal.

The time synchronization control circuit 20 of the slave station 2 sets 1 as an initial value of a slave station number M (step S21).

The time synchronization control circuit 20 of the slave station 2 sets a value for each of the initial time T0, the period Td, the guard band Tg, and the number Mmax of the slave stations (step S22). Note that the time synchronization control circuit 20 of the slave station 2 may read the values to be set from a memory (not illustrated), or may receive the values to be set from an administrator or the like of the slave station 2.

When the slave station number M is equal to or less than the number Mmax of the slave stations provided in the single-fiber bidirectional optical ring system in step S23, the time synchronization control circuit 20 of the slave station 2 calculates the optical signal transmission timing Tm for the optical transmitter included in the slave station corresponding to the slave station number M on the basis of formula (2) (step S24).

$$Tm = T0 + Tg/2 + Td \times (M-1)/M\max + Td \times N \qquad \text{Formula (2)}$$

(N: an integer greater than or equal to 0)

The time synchronization control circuit 20 of the slave station 2 increments the slave station number M by 1 (step S25).

When the slave station number M is greater than the number Mmax of the slave stations in step S23, the time synchronization control circuit 20 of the slave station 2 ends adjustment of the timing for causing the optical transceiver 9 to output an optical signal.

The present disclosure has an effect of allowing a network using redundant optical fibers to be provided with a simple configuration.

Note that when the single-fiber bidirectional optical ring system includes a plurality of the slave stations 2, the time synchronization control circuit 20 of a certain slave station 2 may adjust not only the optical signal transmission timing Tm for the optical transceiver 9 included in the certain slave station 2 but also the optical signal transmission timing Tm for the optical transceiver 9 included in another slave station 2. Then, the time synchronization control circuit 20 of the certain slave station 2 may transmit a result of adjusting the optical signal transmission timing Tm to the time synchronization control circuit 20 of the another slave station 2 by using a known communication method. Alternatively, the time synchronization control circuit 19 of the central station 1 may adjust the optical signal transmission timings Tm for the optical transceivers 9 included in the slave stations 2. Then, the time synchronization control circuit 19 of the central station 1 may transmit results of adjusting the optical signal transmission timings Tm to the time synchronization control circuits 20 of the slave stations 2, respectively, by using a known communication method.

What is claimed is:

1. A single-fiber bidirectional optical ring system comprising:
   a central station;
   one or more slave stations to perform single-fiber bidirectional communication with the central station; and
   a network in which the central station and the one or more slave stations are connected in a ring shape by optical fibers, wherein
   the central station includes:
   a first single-fiber bidirectional optical transceiver connected in a clockwise direction of the network, the first single-fiber bidirectional optical transceiver outputting a downstream optical signal of a second wavelength and receiving an upstream optical signal of a first wavelength output from the one or more slave stations;
   a second single-fiber bidirectional optical transceiver connected in a counterclockwise direction of the network, the second single-fiber bidirectional optical transceiver outputting a downstream optical signal of the second wavelength and receiving an upstream optical signal of the first wavelength output from the one or more slave stations; and
   first time synchronization control circuitry to adjust timings at which the first single-fiber bidirectional optical transceiver and the second single-fiber bidirectional optical transceiver output the downstream optical signals of the second wavelength, and cause the first single-fiber bidirectional optical transceiver and the second single-fiber bidirectional optical transceiver to output the downstream optical signals of the second wavelength in different time slots into which a predetermined cycle is divided.

2. The single-fiber bidirectional optical ring system according to claim 1, wherein
   the slave station includes:
   a second optical coupler connected in the clockwise direction of the network;
   a first optical coupler connected to the second optical coupler, the first optical coupler being connected in the counterclockwise direction of the network;
   a third optical coupler connected to the first optical coupler and the second optical coupler;
   a third single-fiber bidirectional optical transceiver connected to the third optical coupler, the third single-fiber bidirectional optical transceiver outputting an upstream optical signal of the first wavelength and receiving the downstream optical signals of the second wavelength; and
   second time synchronization control circuitry to adjust timings at which the third single-fiber bidirectional optical transceivers output upstream optical signals of the first wavelength, and cause the third single-fiber bidirectional optical transceivers to output the upstream optical signals of the first wavelength in different time slots into which a predetermined cycle is divided according to a number of the slave stations.

3. The single-fiber bidirectional optical ring system according to claim 1, wherein
   the first single-fiber bidirectional optical transceiver and the second single-fiber bidirectional optical transceiver each include:
   an optical transmitter to generate a downstream optical signal of the second wavelength;
   an optical isolator to transmit the downstream optical signal of the second wavelength generated by the optical transmitter, and block an optical signal traveling in a direction opposite to a direction in which the downstream optical signal of the second wavelength travels;
   an optical wavelength demultiplexing filter to output, to the network, the downstream optical signal of the second wavelength transmitted through the optical isolator, and demultiplex and extract the upstream optical signal of the first wavelength output from the slave station; and
   an optical receiver to receive the upstream optical signal of the first wavelength demultiplexed and extracted by the optical wavelength demultiplexing filter.

4. The single-fiber bidirectional optical ring system according to claim 2, wherein
   the third single-fiber bidirectional optical transceiver includes:
   an optical transmitter to generate an upstream optical signal of the first wavelength;

an optical isolator to transmit the upstream optical signal of the first wavelength generated by the optical transmitter, and block an optical signal traveling in a direction opposite to a direction in which the upstream optical signal of the first wavelength travels;

an optical wavelength demultiplexing filter to output, to the network, the upstream optical signal of the first wavelength transmitted through the optical isolator, and demultiplex and extract the downstream optical signals of the second wavelength output from the central station; and an optical receiver to receive the downstream optical signals of the second wavelength demultiplexed and extracted by the optical wavelength demultiplexing filter.

5. A plurality of the single-fiber bidirectional optical ring systems according to claim 1, sharing the first time synchronization control circuitry of the central station, wherein the first time synchronization control circuitry of the central station adjusts timings for outputting downstream optical signals of the second wavelength for each of the single-fiber bidirectional optical ring systems.

6. The single-fiber bidirectional optical ring system according to claim 1, comprising the central stations connected in parallel to the network, wherein the first time synchronization control circuitry of the central stations cause single-fiber bidirectional optical transceivers to output downstream optical signals of the second wavelength in time slots into which a predetermined cycle is divided according to a total number of the single-fiber bidirectional optical transceivers included in the central stations.

7. A method for controlling a single-fiber bidirectional optical ring system including a central station, a slave station to perform single-fiber bidirectional communication with the central station, and a network in which the central station and the slave station are connected in a ring shape by optical fibers, the method comprising:

causing first time synchronization control circuitry of the central station to adjust timings at which a first single-fiber bidirectional optical transceiver and a second single-fiber bidirectional optical transceiver output downstream optical signals of a downstream wavelength, and cause the first single-fiber bidirectional optical transceiver and the second single-fiber bidirectional optical transceiver to output the downstream optical signals of the downstream wavelength in different time slots into which a predetermined cycle is divided.

8. A central station to perform single-fiber bidirectional communication with a slave station, the central station and the slave station being network-connected in a ring shape by optical fibers, the central station comprising:

a first single-fiber bidirectional optical transceiver connected in a clockwise direction of a network, the first single-fiber bidirectional optical transceiver outputting a downstream optical signal of a second wavelength and receiving an upstream optical signal of a first wavelength output from the slave station;

a second single-fiber bidirectional optical transceiver connected in a counterclockwise direction of the network, the second single-fiber bidirectional optical transceiver outputting a downstream optical signal of the second wavelength and receiving an upstream optical signal of the first wavelength output from the slave station; and first time synchronization control circuitry to adjust timings at which the first single-fiber bidirectional optical transceiver and the second single-fiber bidirectional optical transceiver output the downstream optical signals of the second wavelength, and cause the first single-fiber bidirectional optical transceiver and the second single-fiber bidirectional optical transceiver to output the downstream optical signals of the second wavelength in different time slots into which a predetermined cycle is divided.

* * * * *